United States Patent
Minoo et al.

(10) Patent No.: US 9,949,015 B1
(45) Date of Patent: Apr. 17, 2018

(54) WIRELESS HEADSET CARRYING CASE WITH WIRELESS TRANSMITTER

(71) Applicant: Apple Inc., Cupertino, CA (US)

(72) Inventors: Jahan C. Minoo, San Jose, CA (US); Lee M. Panecki, San Francisco, CA (US); Zachary C. Rich, Sunnyvale, CA (US); Patrick T. Ryan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/698,577

(22) Filed: Sep. 7, 2017

Related U.S. Application Data

(60) Provisional application No. 62/399,183, filed on Sep. 23, 2016, provisional application No. 62/399,238, filed on Sep. 23, 2016.

(51) Int. Cl.
*H04R 1/10* (2006.01)

(52) U.S. Cl.
CPC ......... *H04R 1/1041* (2013.01); *H04R 1/1016* (2013.01); *H04R 1/1025* (2013.01); *H04R 1/1091* (2013.01); *H04R 2420/07* (2013.01)

(58) Field of Classification Search
CPC .. H04R 1/1041; H04R 1/1016; H04R 1/1025; H04R 1/1091; H04R 2420/07
USPC .......................................................... 381/74
See application file for complete search history.

(56) References Cited

U.S. PATENT DOCUMENTS

| | | | |
|---|---|---|---|
| 8,238,967 B1* | 8/2012 | Arnold | 455/556.1 |
| 8,483,755 B2* | 7/2013 | Kumar | G06F 1/1616 455/41.2 |
| 2010/0320961 A1* | 12/2010 | Castillo | H02J 7/0044 320/107 |
| 2011/0117840 A1* | 5/2011 | Li | H04M 1/0258 455/41.2 |
| 2015/0245125 A1* | 8/2015 | Shaffer | H04R 1/1025 381/74 |
| 2015/0245126 A1* | 8/2015 | Shaffer | H04R 1/1025 381/74 |
| 2015/0373448 A1* | 12/2015 | Shaffer | H04R 1/1025 381/74 |
| 2016/0073189 A1* | 3/2016 | Linden | H04R 1/1025 381/74 |
| 2017/0094396 A1 | 3/2017 | Chandramohan et al. | |
| 2017/0231345 A1* | 8/2017 | Gronewoller | A45C 11/00 455/575.8 |

* cited by examiner

*Primary Examiner* — David Ton
(74) *Attorney, Agent, or Firm* — Kilpatrick Townsend & Stockton LLP

(57) ABSTRACT

A case for a wireless electronic listening device (e.g., a pair of wireless earbuds) is configured to house a pair of wireless earbuds and charge the earbuds when they are in the case. The case is further configured to receive media received by the wireless earbuds and transmit the media to a non-wireless output device connected to the case. The case may further include its own wireless radio that can wirelessly communicate audio to the wireless earbuds when the earbuds are not in the case. The case may further include an input port to receive an audio signal from a non-wireless source and may be configured to wirelessly transmit the audio received from the source to the wireless earbuds.

20 Claims, 11 Drawing Sheets

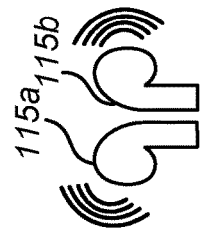
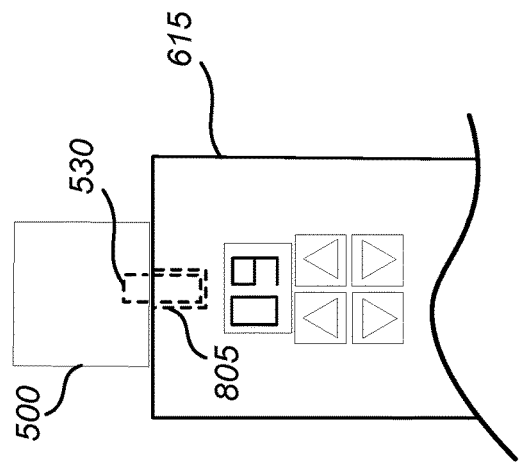
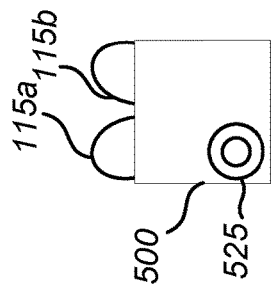
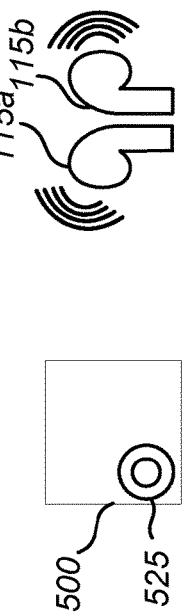
FIG. 7A
FIG. 7B
FIG. 8

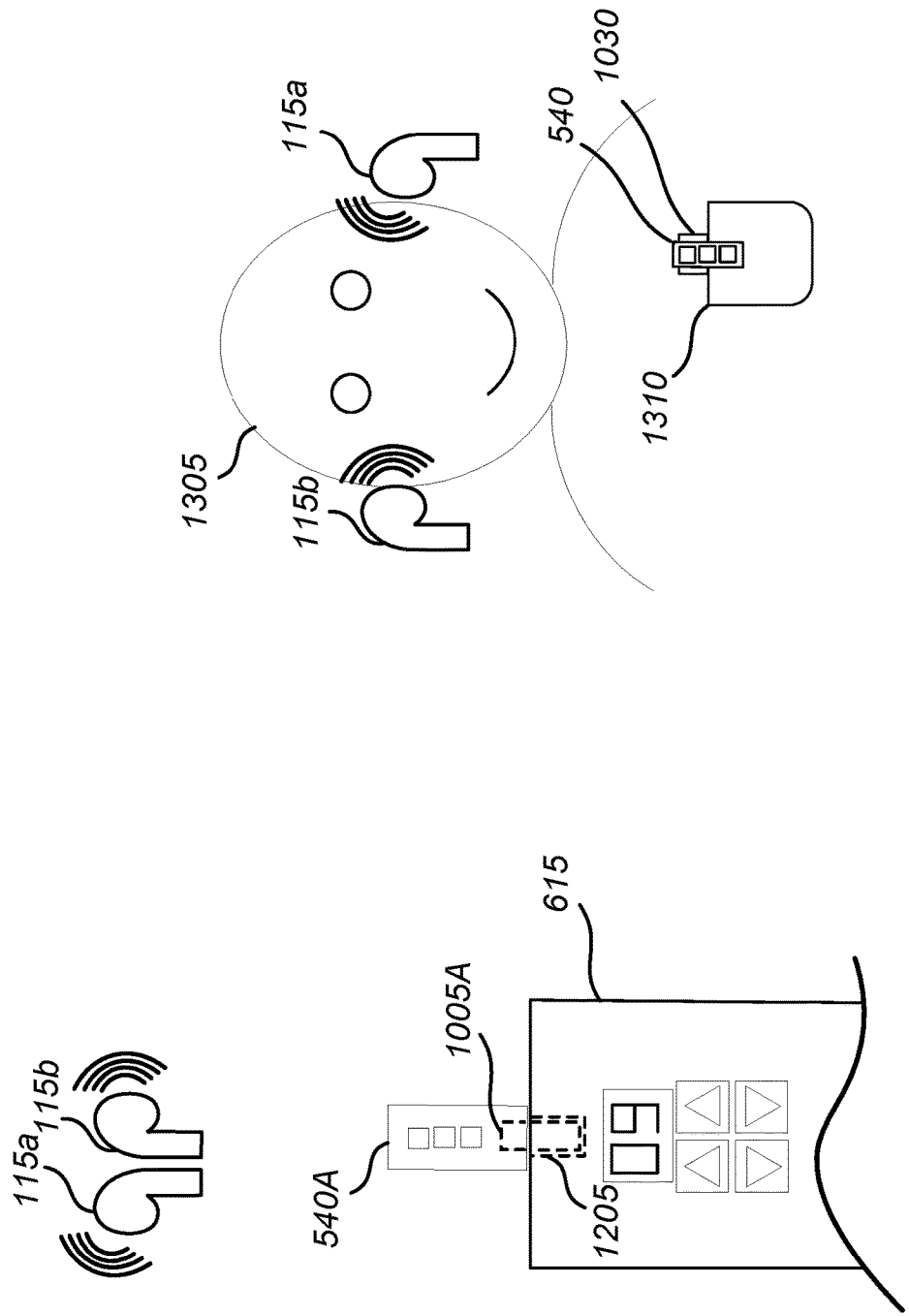

WIRELESS HEADSET CARRYING CASE WITH WIRELESS TRANSMITTER

CROSS-REFERENCES TO RELATED APPLICATIONS

This application claims the benefit of U.S. provisional patent application Nos. 62/399,183 entitled "WIRELESS HEADSET CARRYING CASE WITH DIGITAL AUDIO OUTPUT PORT" and 62/399,238 entitled "WIRELESS HEADSET CARRYING CASE WITH WIRELESS TRANSMITTER" each of which was filed Sep. 23, 2016, and each of which is hereby incorporated by reference in its entirety.

BACKGROUND

The described embodiments relate generally to cases for portable listening devices such as earbuds and headphones.

Portable wireless listening devices typically use some form of a headset or earbud in order to maintain privacy for the user and/or to avoid annoying bystanders. Users often prefer wireless portable listening devices because there are no cords to deal with and the listening device may be less noticeable. Some portable wireless listening devices, such as earbuds, can be relatively small and easy to lose when not in use. Thus, portable wireless listening devices can be stored in cases.

Many media output systems (e.g., some speakers) are not capable of wirelessly receiving media, but rather require a direct docking or wired connection with a phone or music device, restricting the use and reducing flexibility of such output systems. Similarly, many audio sources (e.g., in-flight entertainment systems, treadmill or other gym equipment audio systems, car audio systems, etc.) also require a wired connection to output audio to listening devices and can't interface wirelessly with portable wireless listening devices, so the portable wireless listening devices need to be used with wired adapters or need to be replaced with wired listening devices.

SUMMARY

Some embodiments of the present disclosure relate to a case for storing and charging wireless headphones and other accessory components. The case can also interface with non-wireless media devices enabling such devices to communicate (stream and output audio, video, etc.) with wireless components, including phone/music devices as well as the wireless headphones stored in the case themselves. Embodiments of the disclosure enable a user to use a non-wireless media output device, such as a speaker or display monitor, to output media received wirelessly from a phone or personal media device and/or to pair a non-wireless source device, such as an in-flight or gym entertainment system, to portable wireless listening devices.

According to some embodiments of the disclosure a case for an earbud having a rechargeable battery and a wireless radio for receiving media data is disclosed where the case includes: a housing having a receptacle sized and shaped to receive the earbud; an earbud interface coupled to the receptacle to provide an electrical interface between the earbud and the case when the earbud is received in the receptacle; a charging system coupled to the earbud interface and configured to charge the rechargeable battery of the earbud when the earbud is received in the receptacle; a connector configured to electrically couple the case to an output device; and circuitry disposed within the housing and electrically coupled to the earbud interface and the connector, the circuitry configured to, when the earbud is received in the receptacle, receive media data received by the wireless radio of the earbud and transmit the media data to the output device through the connector.

In some embodiments an audio system is provided that includes: a wireless earbud (or a pair of wireless earbuds), and a case for storing and charging the wireless earbud (or pair of wireless earbuds). The wireless earbud (or each earbud in the pair of wireless earbuds) can include a wireless radio and a battery where the wireless radio is configured to wirelessly receive audio data from a source device. The case for the wireless earbud (or pair of earbuds) can include a housing that has a receptacle configured to receive the wireless earbud (or pair of earbuds); an earbud interface having one or more electrical contacts disposed in the receptacle and positioned to electrically couple the case to the wireless earbud (or pair of wireless earbuds) when the wireless earbud (or pair) is received in the receptacle; a charging system operatively coupled to earbud interface to provide power to the wireless earbud (or pair of earbuds) over the one or more electrical contacts; an output device interface configured to electrically connect the case to a secondary electronic device having at least one speaker; and circuitry disposed within the housing and operatively coupled to the earbud interface and the output device interface, the circuitry configured to, when earbud (or pair of earbuds) is received in the receptacle, receive audio data received by the wireless radio of an earbud from a source device and transmit the audio data to the secondary electronic device through the output device interface.

In various implementations, the case for storing an earbud according to embodiments disclosed herein can include one or more of the following features. The case can further include a lid attached to the housing and operable between a closed position where the lid conceals the earbud within the case and an open position that allows a user to remove the earbud from the case. The connector can include a plurality of contacts including one or more data contacts that are configured to electrically couple to the output device so as to output the media data received by the wireless radio of the earbud to the output device and at least one power contact configured to receive power from a power source. The earbud interface can include an earbud connector having at least one contact that is positioned to operatively couple to the earbud when the earbud is received in the receptacle to provide power to the earbud.

In some implementations, the audio or media data is received from a source device paired with the earbud and circuitry within the case is configured to send an identification signal to the source device via the wireless radio of the earbud. The identification signal is then usable by the source device to update an indicator on the source device to reflect that the earbud is received in the receptacle and that media data is being transmitted to the output device.

In some embodiments a case for an in-ear speaker device having a wireless radio for receiving media data is provided. The case can include: a housing having a receptacle configured to receive the in-ear speaker device; a device interface coupled to the receptacle to provide an electrical interface between the in-ear speaker device and the case when the in-ear speaker device is received in the receptacle; a connector configured to electrically couple the case to an output device; and circuitry disposed within the housing and electrically coupled to the device interface and the connector. The circuitry is configured to, when the in-ear speaker device is received in the receptacle, receive media data received by the wireless radio of the in-ear speaker device and transmit the media data to the output device through the connector.

In some implementations the in-ear speaker device can include an earbud or a pair of earbuds and the receptacle can include a cavity sized and shaped to receive the earbud or two cavities where each is sized and shaped to receive one of the earbuds in the pair. The case can also include a first sensor disposed within the housing and configured to detect when the in-ear speaker device is received in the receptacle; a second sensor disposed within the housing and configured to detect when the output device is coupled to the connector; and the circuitry can be configured to turn on the wireless radio when the first sensor detects the in-ear speaker device in the receptacle and the second sensor detects that the output device is coupled to the connector, and turn off the wireless radio when the first sensor detects the in-ear speaker device in the receptacle and the second sensor detects that no output device is coupled to the connector.

In some embodiments a method of using an earbud having a wireless receiver to play audio data on an external speaker is provided. The method includes storing the earbud in an earbud case having a receptacle sized and shaped to receive the earbud, an earbud interface coupled to the receptacle to provide an electrical interface between the earbud and the case when the earbud is received in the receptacle, and a connector configured to electrically couple the case to the external speaker; receiving audio data at the wireless receiver of the earbud while the earbud is stored in the receptacle of the earbud case; and transmitting the audio data from the earbud to the external speaker via the earbud interface and then the connector to play the audio data on the external speaker.

According to some embodiments, a case for an earbud having a first wireless radio is provided. The case includes: a housing having a receptacle configured to receive the earbud; a connector coupled to the housing and configured to electrically couple the case to a source device so as to receive an audio signal from the source device; a second wireless radio configured to transmit audio data to the first wireless radio; a power source disposed in the housing and operatively coupled to power the second wireless radio; and circuitry disposed within the housing and configured to establish a connection between the first wireless radio and the second wireless radio, receive the audio signal from the source device via the connector, and convert the audio signal into the audio data to be transmitted by the second wireless radio to the first wireless radio for output by the earbud. In various implementation, the housing of the case can include a first receptacle sized and shaped to receive a first earbud in a pair of earbuds and a second receptacle sized and shaped to receive a second earbud in the pair of earbuds.

In some embodiments an audio system is provided that includes an earbud and a case for storing and charging the earbud. The earbud can include a first wireless radio. The case can include: a housing having a receptacle configured to receive the earbud; a connector coupled to the housing and configured to electrically couple the case to a source device so as to receive an audio signal from the source device; a second wireless radio configured to transmit audio data to the first wireless radio; a power source disposed in the housing and operatively coupled to power the second wireless radio; and circuitry disposed within the housing. The circuitry is configured to: establish a connection between the first wireless radio and the second wireless radio, receive the audio signal from the source device via the connector, and convert the audio signal into the audio data to be transmitted by the second wireless radio to the first wireless radio for output by the earbud.

In some implementations the earbud is a first earbud in a pair of earbuds, the audio system further includes a second earbud in the pair of earbuds, and the housing of the case includes a first receptacle sized and shaped to receive the first earbud and a second receptacle sized and shaped to receive the second earbud. In some implementations the audio system can further include a controller, separate from the case and the earbud, that is operable to stop and start transmission of the audio data from the second wireless radio to the pair of earbuds. The controller can further include volume and/or playback that control the audio signal played by the first and second earbuds. Additionally, the case can further include a third receptacle sized and shaped to receive the controller. In some implementations, the third receptacle is disposed between the first and second receptacles. In some implementations the case further includes a lid coupled to the housing by a hinge, the lid being moveable between a closed position in which the lid covers encases the first and second earbuds and the controller within the case and an open position in which a user can remove one or more of the first and second earbuds or the controller from the case. The case further including a lid coupled to the housing by a hinge, the lid being moveable between a closed position in which the lid covers encases the first and second earbuds and an open position in which a user can remove one or more of the first and second earbuds from the case.

In some embodiments a case for a portable listening device having a first wireless radio is provided. The case can include: a housing having a receptacle configured to receive the portable listening device; a rechargeable case battery disposed in the housing; charging circuitry coupled to the rechargeable battery and the receptacle and configured to charge the portable listening device when the portable listening device is received in the receptacle; a memory disposed in the housing and configured to store audio data; a processor disposed in the housing and operably coupled to access audio data stored in the memory; and a second wireless radio operatively coupled to receive audio data from the processor and transmit the audio data to the first wireless radio to be output by the portable listening device. The case also include a user interface disposed at an exterior surface of the housing, the user interface including one or more controls that enable a user to stop and start the transmission of audio data from case to the portable listening device.

In various implementations the case may include one or more of the following features. The case further including a lid coupled to the housing by a hinge, the lid being moveable between a closed position in which the lid covers encases the first and second earbuds and an open position in which a user can remove one or more of the first and second earbuds from the case. The user interface can further include volume control inputs.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIGS. 7A and 7B are simplified illustrations of the case of FIGS. 5A, 5B, and 6 wirelessly transmitting audio to a pair of wireless earbuds;

FIG. 8 is a simplified illustration of the case of FIGS. 5A, 5B, and 6 wirelessly transmitting audio received from a non-wireless source device to a pair of wireless earbuds;

FIG. 12 is a simplified illustration of a wireless controller wirelessly transmitting audio received from a non-wireless source device to a pair of wireless earbuds as shown in FIGS. 10A-10B and 11.

FIG. 13 is a simplified illustration of a wireless controller wirelessly controlling audio transmission to a pair of wireless earbuds as shown in FIGS. 10A-10B and 11.

DETAILED DESCRIPTION

Figure 1:
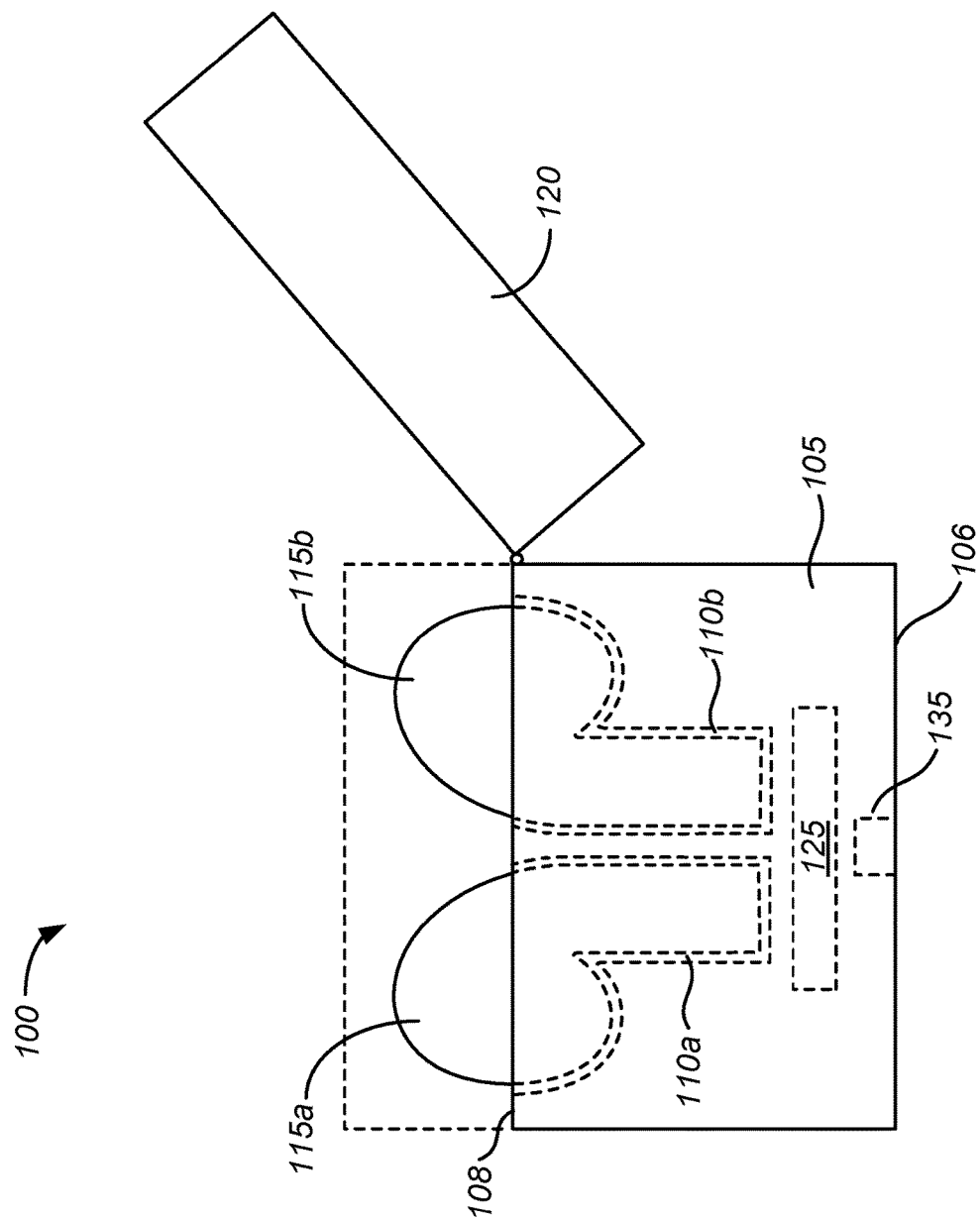
FIG. 1 is a side view of a case configured to hold a pair of earbuds and transmit media to a non-wireless output device according to embodiments of the disclosure.

Some embodiments of the present disclosure relate to a case for containing a portable wireless listening device, transmitting audio received by the portable wireless listening device to other devices, and/or transmitting audio received from other sources to the portable wireless listening device. While the present disclosure can be useful for a wide variety of portable wireless listening devices, some embodiments of the disclosure are particularly useful for portable wireless earbuds as described in more detail below.

For example, in some embodiments, a case is configured to house a pair of wireless earbuds and charge the earbuds when they are in the case. The case can have circuitry configured to receive media received by the wireless earbuds and transmit the media to a non-wireless output device such as a speaker electrically coupled to the case. The case can have sensors to detect if the wireless earbuds are in the case and to detect if an output device is connected to the case. The case circuitry can activate the wireless radio of the earbuds if the earbuds are detected and an output device is connected to allow transmission to the output device, and can deactivate the wireless radio of the earbuds if no output device is connected.

In another example, the case can have its own wireless radio that can wirelessly communicate audio to the earbuds if the earbuds are not in the case. In some embodiments, the case can have an input port to receive an audio signal from a non-wireless source device, and the case circuitry can convert the audio signal received from the non-wireless source device to an audio signal to be transmitted wirelessly to the earbuds. In some embodiments, the case can have its own memory to store audio data that can be transmitted wirelessly to the earbuds. In some examples, the case can have buttons to control playback and/or volume of audio transmitted to be output by the earbuds. In further examples, the case can be configured to receive and/or charge a wireless controller that controls playback and/or volume of audio output by the earbuds.

In order to better appreciate the features and aspects of cases for portable wireless listening devices according to the present disclosure, further context for the disclosure is provided in the following section by discussing several particular implementations of a case for a set of wireless earbuds according to embodiments of the present disclosure. The specific embodiments discussed are for example purposes only and other embodiments can be employed in other cases that can be used for other devices such as, but not limited to headsets, headphones, portable speakers and other devices.

As used herein, the term "portable listening device" includes any portable device designed to play sound that can be heard by a user, and thus, the term "portable wireless listening device" includes any wireless device designed to play sound that can be heard by a user. Headphones are one type of portable listening device, portable speakers are another. The term "headphones" represents a pair of small, portable listening devices that are designed to be worn on or around a user's head. They convert an electrical signal to a corresponding sound that can be heard by the user. Headphones include traditional headphones that are worn over a user's head and include left and right listening devices connected to each other by a headband, headsets (a combination of a headphone and a microphone), and earbuds (very small headphones that are designed to be fitted directly in a user's ear). Traditional headphones include both over-ear headphones (sometimes referred to as either circumaural or full-size headphones) that have ear pads that fully encompass a user's ears, and on-ear headphones (sometimes referred to as supra-aural headphones) that have ear pads that press against a user's ear instead of surrounding the ear. As used herein, the term "earbuds", which can also be referred to as earphones or ear-fitting headphones, includes small headphones that fit within a user's outer ear facing the ear canal without being inserted into the ear canal; in-ear headphones, sometimes referred to as canal phones, that are inserted in the ear canal itself; and other small portable devices supported by, and that include a speaker fitted within, a portion of a user's ear.

FIG. 1 depicts an illustrative rendering of a case 100 for a pair of wireless earbuds according to some embodiments of the disclosure. Case 100 includes a housing 105 having one or more receptacles 110a, 110b configured to receive a pair of earbuds 115a, 115b. As shown in FIG. 1, receptacles 110a, 110b can be positioned adjacent to each other on opposite sides of a center plane of case 100. Each receptacle 110a, 110b can be a cavity sized and shaped to match that of its respective earbud 115a, 115b. For example, each receptacle 110a, 100b can include an elongated cylindrical portion that extends from a bud shaped portion at an upper surface 108 of the case towards a bottom 106 of case 100. Embodiments of the disclosure are not limited to any particular shape, configuration or number of receptacles 110a, 110b and in other embodiments receptacles 110a, 110b can have different shapes, configurations and/or can be a single receptacle or more than two receptacles.

Case 100 further includes a lid 120 attached to housing 105 and operable between a closed position where lid 120 is aligned over one or more receptacles 110a, 110b fully enclosing pair of earbuds 115a, 115b within the housing and an open position where the lid is displaced from the one or more receptacles such that a user can remove the earbuds from the receptacles or replace the earbuds within the receptacles. Lid 120 can be pivotably attached to housing 105 and can include one or more magnetic elements (not shown in FIG. 1) that, along with magnetic elements in housing 105 (also not shown in FIG. 1), provide lid 120 with a bi-stable operation. Some embodiments of case 100 can also include a charging system 125 configured to charge pair of earbuds 115a, 115b; an output interface 135 configured to output media data received by the pair of earbuds 115a, 115b; and other features that are described in more detail below.

Figure 2:
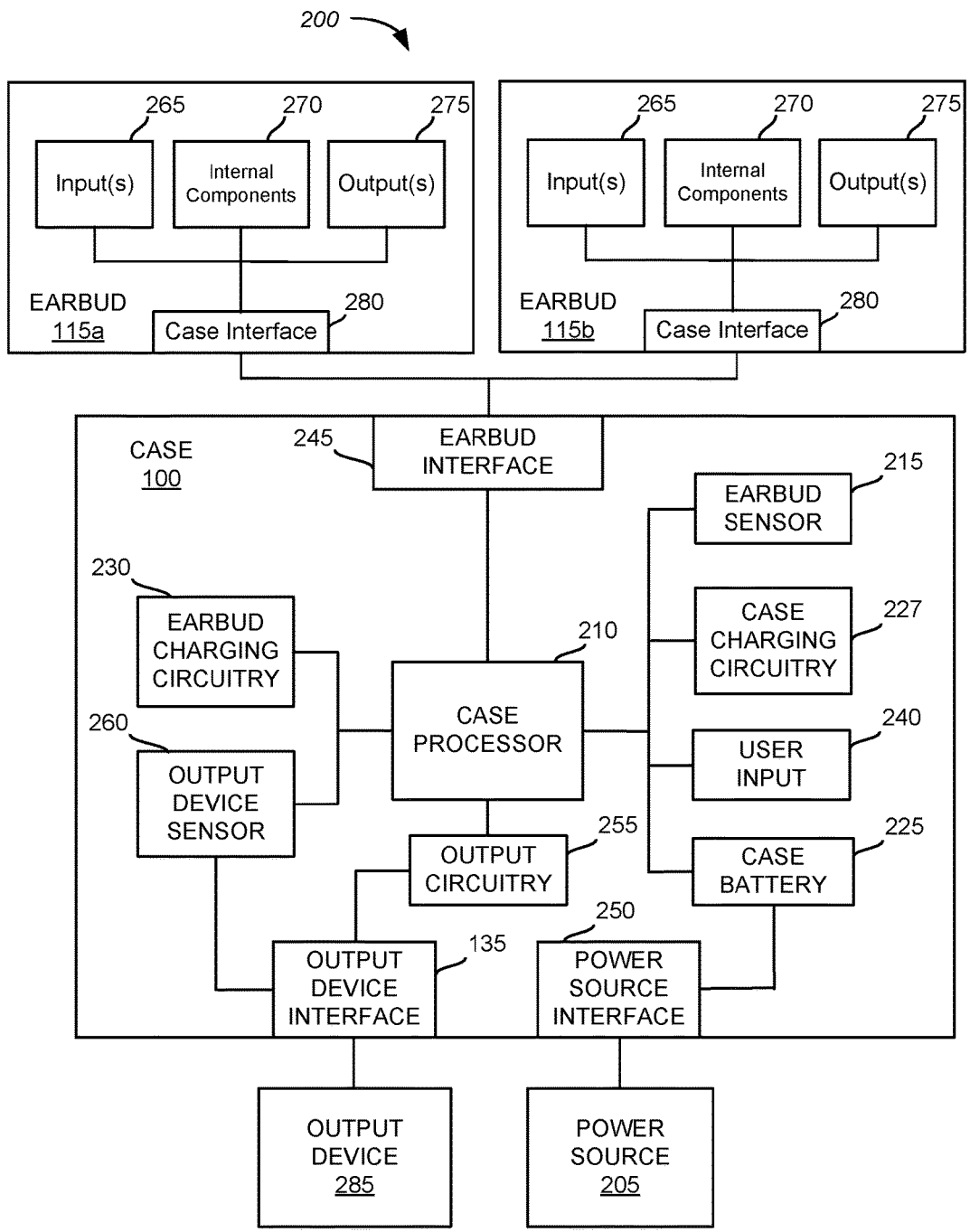
FIG. 2 is a system level diagram of a case coupled to a pair of earbuds and an output device as shown in FIG. 1.

FIG. 2 is a simplified illustration of a system 200 according to embodiments of the disclosure that includes case 100, pair of earbuds 115a, 115b, a power source 205, and an output device 285. Earbuds 115a, 115b can be positioned within case 100 where they can be conveniently stored and charged. To facilitate charging, transmitting media, and other capabilities of case 100, the case can include a case processor 210, an earbud sensor 215, a case battery 225, case charging circuitry 227, earbud charging circuitry 230, output circuitry 255, and output device sensor 260. Case 100 also includes an earbud interface 245 that enables circuitry within case 100 to communication with and/or charge earbuds 115a, 115b via case transfer interface 280, power source interface 250 that couples the case to power source 205, such as an AC or DC power source, and output device interface 135 that couples the case to an output device 285, such as a speaker or display. As one example, earbud interface 245 can include one or more contacts that electrically connect to corresponding contacts of case transfer interface 280 in each of earbuds 115a, 115b when the earbuds are received within cavities 110a, 110b. The contacts enable case 100 and earbuds 115a, 115b to exchange data with each other and can also enable case 100 to charge the rechargeable battery within each earbud.

Case processor 210 can be configured to control various functions of case 100 as described in more detail below. Earbud sensor 215 detects when one or both of earbuds 115a, 115b are placed in receptacles 110a, 110b (see FIG. 1). In some embodiments there may only be one earbud sensor 215 that detects when one earbud 115a, 115b is placed within its respective receptacle 110a, 110 and initiates charging of both earbuds. In further embodiments there may be one earbud sensor 215 in each receptacle 110a, 110b, while in yet further embodiments there may be one earbud sensor between the receptacles that detects when either earbud within its respective receptacle. In various embodiments case processor 210 or other circuitry can be coupled to earbud sensor 215 and can be configured to initiate charging of each earbud 115a, 115b when earbud sensor 215 detects one of the earbuds within receptacles 110a, 110b (see FIG. 1) and cease charging when the earbuds are removed from the receptacles. In some embodiments earbud sensor 215 can be any type of mechanical or electrical switch, including but not limited to a momentary switch, a capacitive sensor, a magnetic sensor (e.g., hall effect) or an optical sensor. In some embodiments there is no case processor 210 and circuitry comprising various active and/or passive components is configured to perform the myriad functions described herein and attributed to the processor.

Case battery 225 provides power for the circuitry associated with case 100 and can be charged by power source 205 and enclosure charging circuitry 225 through power source interface 250. Case battery 225 is also coupled to earbud interface 245 and can charge pair of earbuds 115a, 115b (via case transfer interfaces 280) in conjunction with earbud charging circuitry 230. In some embodiments charging system 125 (which can include any of the aforementioned sensors, processors, batteries, and circuitry used for charging the earbuds and/or the case) can be configured to charge pair of earbuds 115a, 115b anytime they are positioned within receptacles 110a, 110b, even though case 100 is not coupled to power source 205. Thus, case 100 may be capable of charging pair of earbuds 115a, 115b while the case is, for example, in a user's pocket as long as case battery 225 has sufficient charge. In various embodiments case battery 225 can be sealed within case 100, while in some embodiments the case battery can be removable for servicing and/or replacement with another charged battery. Case processor 210 may additionally be coupled to case charging circuitry 227 that can control the charging of case battery 225 (e.g., control the voltage and current supplied to the battery to optimize the speed of charging and the life of the battery). In some embodiments case charging circuitry 227 can include a DC/DC converter, an AC/DC converter, battery voltage level monitoring circuitry and/or safety features to properly charge case battery 225.

Similarly, in some embodiments case processor 210 can be coupled to earbud charging circuitry 230 that can control the charging of batteries within pair of earbuds 115a, 115b (e.g., control the voltage and current supplied to the batteries to optimize the speed of charging and the life of the batteries). In various embodiments earbud charging circuitry 230 can include a DC/DC converter, battery voltage level monitoring circuitry and/or safety features to properly charge earbud batteries.

In some embodiments case processor 210 can communicate with pair of earbuds 115a, 115b through an earbud interface 245 (and through case transfer interface 280 of either or both earbuds) and with power source 205 through a power source interface 250. In various embodiments earbud interface 245 and power source interface 250 can be capable of carrying both power and data signals for single or bidirectional communication. For example, in some embodiments power source 205 can be a computing device that communicates with power source interface 250 through a USB interconnect or Lightning interconnect available from Apple Inc. of Cupertino Calif. The interconnect can provide DC current to case battery 225 for charging and can provide bidirectional communication between case processor 210 and the computing device. For example, in various embodiments power source 205 can transmit firmware updates to both case processor 210 and pair of earbuds 115a, 115b. Data communication between earbud interface 245 and case transfer interface 280 of each of the pair of earbuds 115a, 115b can use a similar communication protocol or any other protocol such as serial communications. In some embodiments, case processor 210 can be configured to receive media signals from earbuds 115*a*, 115*b* through earbud interface 245. For example, earbuds 115*a*, 115*b* can wirelessly receive media signals from a media player such as a smart phone, a portable audio device, a portable video device, and/or a laptop computer, and transmit the media signals received to the case processor 210 through earbud interface 245 for further processing and/or transmission as will be described in further detail below. Thus, in some embodiments, earbud interface 245 can include connectors with contacts that provide the necessary bandwidth capability in order to allow transmission of media signals such as digital audio signals or digital video signals from earbuds 115*a*, 115*b* to case processor 210.

As noted above, each of earbuds 115*a*, 115*b* can include a wireless radio that enables the earbuds to wirelessly receive media signals from a media player, such as a smart phone, portable audio or video device, or laptop. In some embodiments, one of earbuds 115*a*, 115*b* can be a primary earbud that pairs with a media player, receives the entire media signal from the media player with its wireless radio and transmits one channel of the media (e.g., the left or right channel, depending on which earbud is the primary earbud) to the other earbud's wireless radio. For example, if the primary earbud is the left earbud, it can pair with the media player, receive a signal needed to play media in stereo, transmit the signal for the right channel to the right earbud, and play the left channel so that the earbuds together play the media in stereo. In some embodiments one or more of earbuds 115*a*, 115*b* include a radio that can also transmit an audio signal such as a microphone signal from one or more of the earbuds. In yet further embodiments, one or more of earbuds 115*a*, 115*b* can include a radio that can transmit communication signals that can command the receiving device to perform one or more functions such as, but not limited to, connect a phone call, disconnect a phone call, pause audio playback, fast forward or rewind audio playback or mute a microphone signal. The wireless radio can employ any short range, low power communication protocol such as Bluetooth, low power Bluetooth or other protocols. In some embodiments it can be desirable to turn off the wireless radios of earbuds 115*a*, 115*b* when they are received in receptacles 110*a*, 110*b* to conserve power and efficiently charge earbuds 115*a*, 115*b*. However, as noted above, in some embodiments, case 100 and the associated circuitry described herein can be configured to use the wireless radios of earbuds 115*a*, 115*b* to receive media signals from any of the media players mentioned above and transmit them to an output device 285 coupled to case 100 through output device interface 135. For example, when earbuds 115*a*, 115*b* receive media signals when they are within receptacles 110*a*, 110*b* of case 100, case processor 210 can be configured to cause earbuds 115*a*, 115*b* to re-transmit the media data to case processor 210 rather than outputting the received data via speakers of earbuds 115*a*, 115*b* as in normal operation thereof. In this way, devices such as speakers or video displays which may not otherwise be able to wirelessly receive audio or video to be output may effectively do so when coupled to case 100 with wireless earbuds 115*a*, 115*b* disposed therein.

In some embodiments, case processor 210 can communicate with output device 285 through output device interface 135 and output circuitry 255. As described above, case processor 210 can receive media signals received by earbuds 115*a*, 115*b* through earbud interface 245. Upon receipt of media signals from earbuds 115*a*, 115*b*, case processor 210 can use output circuitry 255 to process media signals and output the media signals to an output device 285 via output device interface 285. Output circuitry 255 can include any suitable media processing circuitry including audio circuitry or video circuitry for processing media signals received from earbuds 115*a*, 115*b* to be output to output device 285. For example, output circuitry 255 can be configured to convert the media signals received from earbuds 115*a*, 115*b* via earbud interface 245 to a suitable format for being output by device 285. As described above, output device 285 can be any device configured to output media, such as audio or video data, including but not limited to audio speakers and video displays. In some embodiments, output device 285 can be an output device without a wireless radio such that it is not able, on its own, to wirelessly receive media to be output. Output device 285 can be configured to communicate with output device interface 135 through any interconnect for transmitting media signals, including but not limited to a Lightning interconnect available from Apple Inc. of Cupertino, Calif., a USB interconnect, such as a USB Type-A connector, a micro USB connector, a USB Type-C connector, any other suitable interconnect, and/or any suitable combination thereof.

Case processor 210 can also be coupled to output device sensor 260. Output device sensor 260 detects when an output device 285 is coupled to case 100 via output device interface 135. In some embodiments, output device sensor 260 can detect when an output device 285 is powered on and/or able to receive media from case 100. In some embodiments output device sensor 260 can detect the type of output device 285 coupled to case 100 and transmit information indicative of the type of output device 285 to case processor 210. In various embodiments case processor 210 or other circuitry can be configured to power on the wireless radios of earbuds 115*a*, 115*b* and/or initiate transmission of media to output device 285 when output device sensor 260 detects an output device 285 coupled to output device interface 135, and can be configured to power off the wireless radios of earbuds 115*a*, 115*b* (and any other components used for transmission of media to output device 285) and cease transmission of media via output circuitry when output device sensor 260 does not detect an output device 285 coupled to output device interface 135. In some embodiments output device sensor 260 can be any type of mechanical or electrical switch, including but not limited to a momentary switch, a capacitive sensor, a magnetic sensor (e.g., hall effect) or an optical sensor. In some embodiments there is no case processor 210 and circuitry comprising various active and/or passive components is configured to perform myriad functions described herein and attributed to the processor.

In some embodiments case processor 210 can also be coupled to one or more user input devices 240. One such user input device 240 can be a button or other type of input that, in response to receiving the user input, processor 210 sends a signal to the earbuds via earbud interface 245 to place the wireless radios within pair of earbuds 115*a*, 115*b* into a pairing or other mode. For example, in various embodiments the wireless radios used by pair of earbuds 115*a*, 115*b* can be a Bluetooth or other radio system that requires a pairing sequence to establish communication between the pair of earbuds and a wireless transmitter in an electronic device. More specifically, in some embodiments user can depress a pairing button located on case 100 that notifies case processor 210 to communicate to pair of earbuds 115*a*, 115*b* via interface 245 to enter a pairing mode. In some embodiments pair of earbuds 115*a*, 115*b* can be required to be within receptacles 110*a*, 110*b* (see FIG. 1) to enter the pairing mode while in other embodiments they may not need to be within the receptacles.

In some embodiments, case processor 210 can be configured to send an identification signal to the media device transmitting media to earbuds that can be used to update an indicator on the media device that indicates what the media device is paired to. For example, when output device sensor detects the type of output device coupled to case 100 via output device interface 135, and/or when media is being transmitted to output device interface 135, case processor 210 can send a signal to the media device via one of the wireless radios of the pair of earbuds 115a, 115b that can change an indicator on the media device to reflect that the media device is transmitting to the output device via case 100. For example, if case 100 is transmitting audio received from media device to a speaker dock, media device can be updated to indicate that it is paired to the speaker dock via the case.

Referring back to the pair of earbuds 115a, 115b in FIG. 2, they can each have one or more inputs 265, internal components 270 and one or more outputs 275. In some embodiments one or more inputs 265 can be a microphone input and one or more buttons or sensors that register a user's touch. In various embodiments a capacitive sensor can be used as an input 265 and can be used, for example, to answer a call or command pair of earbuds 115a, 115b to enter a pairing mode that can be indicated by a light on the pair of earbuds. In various embodiments one or more internal components 270 can be a speaker, a microphone, a wireless radio, a rechargeable battery and in some cases a processor. In various embodiments one or more outputs 275 can be audio from a speaker, media signals from wireless radio as described above, and a light or other indicator. In some embodiments the light can indicate an incoming call, a battery charge level, a pairing mode or other function.

Although output device interface 135 and power source interface 250 are described and depicted as separate components in FIG. 2, in some embodiments, output interface 135 and power source interface 250 can be part of a single interconnect system having a single connector (e.g., a single Lightning connector). When output interface 135 and power source interface 250 are part of a single interconnect system, the single connector can receive power from a power source within output device 285 while concurrently transmitting media data (e.g., a stream of audio data) to the output device. In some embodiments, additional sensors (not shown) can be employed to determine whether a power source 205 or output device 285 is coupled to the interface so as to effectively route power to charge earbuds 115a, 115b or case battery 225 and/or to transmit media to an output device 285.

Figure 3:
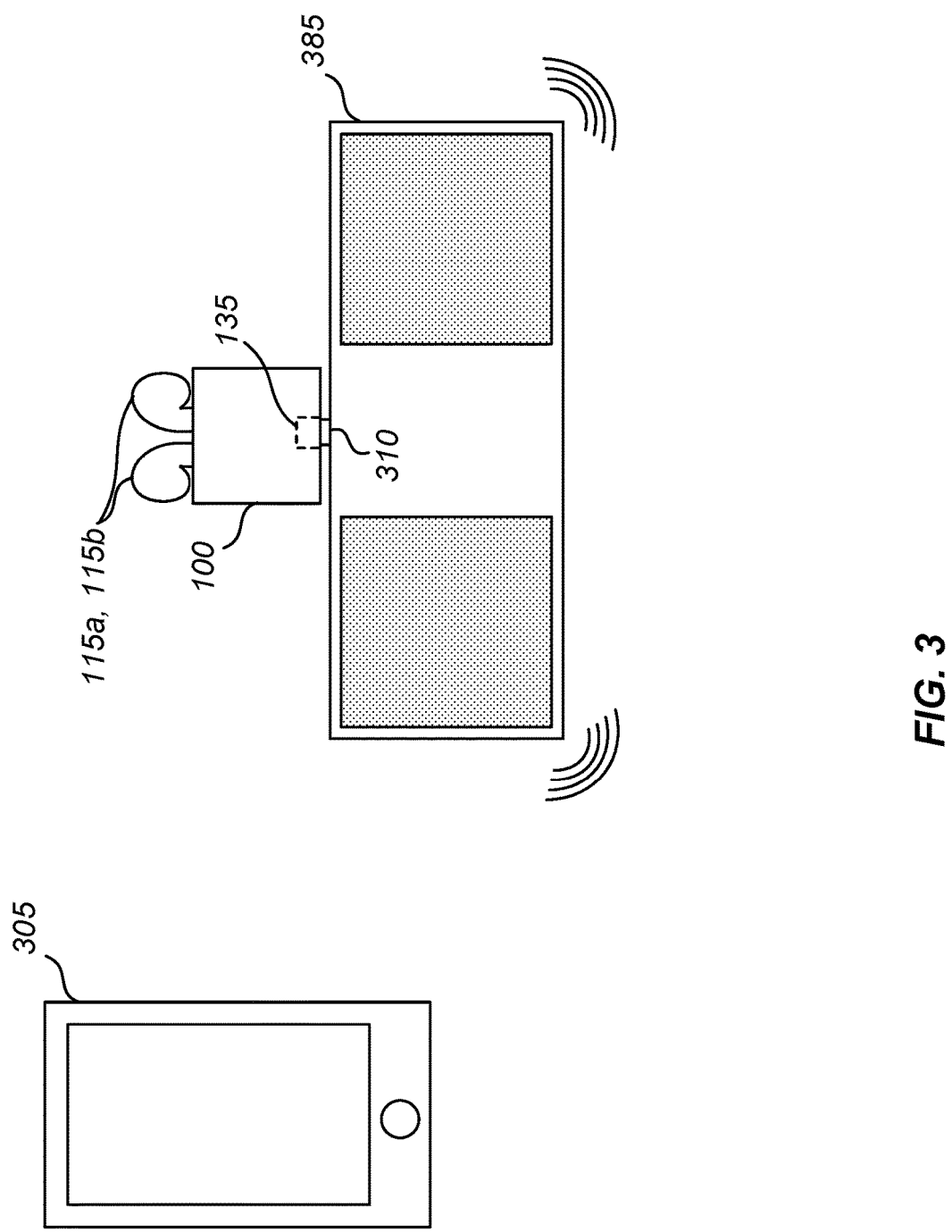
FIG. 3 is a simplified illustration of a case transmitting audio wirelessly received from a source device to a non-wireless speaker as shown in FIGS. 1 and 2.

FIG. 3 is a simplified illustration of case 100 as shown in FIGS. 1 and 2 transmitting audio wirelessly received from a source device to a non-wireless speaker. As described above, embodiments of case 100 can utilize the wireless radios of earbuds 115a, 115b to receive media data from a media player and transmit the media data to be output by an output device coupled to case 100. FIG. 3 shows an example wherein a speaker 385 outputs audio received from a media player 305. Speaker 385 can be an audio speaker device traditionally used to "dock" a media player such as a smart phone or a personal music player via connector 310. In some embodiments, connector 310 can be a Lightning connector available from Apple Incorporated of Cupertino, Calif. While speaker 385 may traditionally require a physical connection with a media player (such as media player 305) via connector 310 in order to receive and output audio from the media player, it can be seen that when wireless earbuds 115a, 115b are disposed in receptacles 110a, 110b (not shown in FIG. 3) of case 100 and connector 310 is coupled to interface 135 of case 100, speaker 385 can output audio from media player 305 without a physical connection thereto. Specifically, as described above with respect to FIGS. 1 and 2, if wireless earbuds 115a, 115b are paired to receive audio from media player 305 via the wireless radios of earbuds 115a, 115b when received in receptacles 110a, 110b of case 100, the audio received can be transmitted via earbud interface 245 to case processor 210. Case processor 210 can then transmit the audio to be processed by output circuitry 255 and transmitted to output device 285 (in this case speaker 385) via output device interface 135. Speaker 385 can then output the audio as shown in FIG. 3 via its speakers. Although FIG. 3 illustratively shows case 100 coupled to and transmitting audio to speaker 385, it will be understood that case 100 can be coupled to and transmit media to any suitable output device 285 in substantially the same way. For example, rather than a speaker device outputting audio, case 100 can be coupled to a video display device. In this example, wireless earbuds 115a, 115b can be configured to wirelessly receive video data from media player 305 and transmit this video data to case processor 210 via earbud interface 245, which can then transmit the video to be processed by output circuitry 255 and output to the video display device via output device interface 135.

Figure 4:
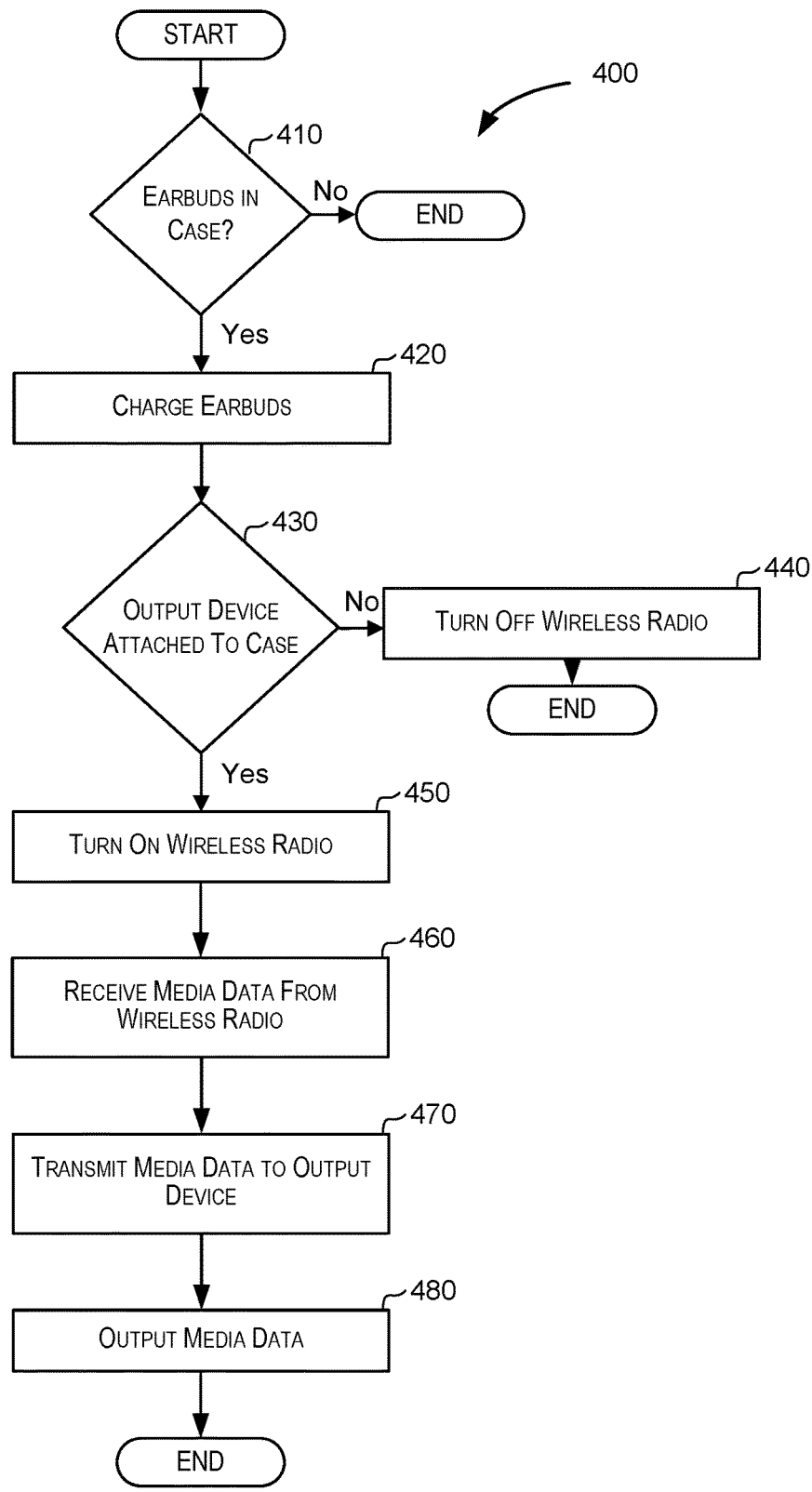
FIG. 4 is a flow chart showing a method of charging a wireless listening device and transmitting media received by the wireless listening device with a case in according to embodiments of the disclosure.

As described above, case 100 can both charge earbuds 115a, 115b and transmit media received by the earbuds 115a, 115b when earbuds 115a, 115b are received in receptacles 110a, 110b. Since case 100 and earbuds 115a, 115b can have rechargeable batteries with limited life, and since it may be desirable to use case 100 to transport earbuds 115a, 115b without power source 205 connected thereto, it may be desirable to efficiently control both charging and powering of components. FIG. 4 is a flow chart showing a method 400 of charging a wireless listening device and transmitting media received by the wireless listening device with a case according to embodiments of the disclosure. It will be understood by those skilled in the art that the order of the steps can be switched, some of the steps can be combined, and/or some of the steps can be optional. The flowchart of FIG. 4 is one example of the method and is not intended to be limiting. Thus, it will be understood by those skilled in the art that various other operation(s) disclosed in this application can be used instead of those shown in FIG. 4. The steps will now be described with reference to FIG. 4.

At step 410, case processor 210 can determine whether earbuds 115a, 115b are received in case 100. In some embodiments, earbud sensor 215 can detect whether one or both of earbuds 115a, 115b are received in receptacles 110a, 110b of case 100 as described above and relay this information to case processor 210. If it is determined at step 410 that neither of earbuds 115a, 115b are received in receptacles 110a, 110b, no action may be taken and the process can end until such time as any earbuds 115a, 115b are detected. In some embodiments, if it is determined at step 410 that neither of earbuds 115a, 115b are received in receptacles 110a, 110b, case 100 can disable any electrical components of case 100 that can be drawing power from case battery 225 so as to conserve battery 225. In some embodiments, case processor 210 can charge case battery 225 when earbuds 115a, 115b are not detected in case 100. For example, if power source 205 is coupled to case 100, case processor 210 can cause case charging circuitry 227 to charge case battery 225.

If it is determined at step 410 that one or both of earbuds 115a, 115b are received in case 100, case processor 210 can proceed to step 420. At step 420, case processor 210 can initiate charging of earbuds 115a, 115b. For example, if earbud sensor 215 detects one or both earbuds 115a, 115b in receptacles 110a, 110b, case processor 210 can cause earbud charging circuitry 230 to draw power from case battery 225 and/or power source 205 (if connected to case 100) to charge the batteries of earbuds 115a, 115b via earbud interface 245. In some embodiments, if power source 205 is coupled to case 100, case processor 210 can cause case charging circuitry 227 to charge case battery 225. Although not described in detail, it will be understood that case processor 210 can optimize charging of earbuds 115a, 115b and/or case battery 225 using any suitable algorithm depending on the capacity and charge level of earbuds 115a, 115b and case battery 225 and whether or not power source 205 is coupled to case.

At step 430, case processor 210 can determine whether an output device 285 is attached to case 100 via output device interface 135. In some embodiments, output device sensor 260 can detect whether an output device 285 is coupled to case 100 via output device interface 135 and relay this information to case processor 210. If it is determined at step 430 that no output device 285 is attached to case 100 via output device interface 135, case processor 210 can proceed to step 440. At step 440, case processor 210 can turn off the wireless radios of earbuds 115a, 115b. In some embodiments, case processor 210 can send a signal or signals to earbuds 115a, 115b via earbud interface 245 to cause wireless radios of earbuds 115a, 115b to power off. In some embodiments, if no output device 285 is detected, case processor 210 can determine whether lid 120 is closed, and turn wireless radios of earbuds 115a, 115b off if lid 120 is closed. For example, case 100 can have lid sensors to detect if lid 120 is closed. It will be understood that when no output device 285 is connected to case 100 and earbuds 115a, 115b are in case 100 (i.e., not being used to listen to audio) and the lid 120 is closed, the wireless radios of earbuds 115a, 115b may not be needed, and turning them off can conserve the batteries of earbuds 115a, 115b, and case battery 225, and allow for more efficient charging. Although depicted in FIG. 4 as the "end" of the process, it will be understood that case processor 210 can continue to charge earbuds 115a, 115b (and case battery 225 to the extent that power source 205 is coupled to case 100) after turning off the wireless radios of earbuds 115a, 115b at step 440 as necessary, and until any output device 285 is thereafter detected by output device sensor 260.

If it is determined at step 430 that an output device 285 is coupled to case 100 via output device interface 135, and if wireless radios of earbuds 115a, 115b are not already on, case processor 210 can turn on the wireless radios of earbuds 115a, 115b at step 450. In some embodiments, case processor 210 can send a signal or signals to earbuds 115a, 115b via earbud interface 245 to cause wireless radios of earbuds 115a, 115b to power on so as to receive media from a media player as described above. Although in some embodiments, case processor 210 can automatically turn on wireless radios of earbuds 115a, 115b when an output device 285 is detected, in other embodiments, case processor 210 may only turn on wireless radios in response to a user input. For example, case processor 210 may only turn on wireless radios of earbuds 115a, 115b if the user presses a button to do so. In some embodiments, an indicator light can be provided on the case that indicates whether the wireless radios of earbuds 115a and/or 115b are on or off in order to facilitate such user control. In further embodiments, case processor 210 may only turn on wireless radios of earbuds 115a, 115b when output device is powered on and able to output media received from case 100. For example, output device sensor 260 can electrically or otherwise detect when output device is powered on and case processor 210 may only turn on wireless radios of earbuds 115a, 115b when output device is powered on.

Although described above as turning on wireless radios of both earbuds 115a, 115b, in some embodiments, the wireless radio of only one of earbuds 115a, 115b can be turned on and/or the wireless radio of the second of earbuds 115a, 115b can be turned off or remain off at step 450. For example, as described above, while both earbuds 115a, 115b can have wireless radios, one of earbud 115a, 115b can be the primary earbud that receives media from a source media device and transmits one channel of the media to the other earbud. Accordingly, in some embodiments, case processor 210 may only turn on the wireless radio of the primary earbud of earbuds 115a, 115b at step 450, since this wireless radio alone can transmit media to an output device as described below.

Although described above as turning on one or both of the wireless radios of earbuds 115a, 115b, it will be understood that in some embodiments, the wireless radios can already be turned on when received in case 100. For example, in some embodiments, the wireless radios of earbuds 115a, 115b can generally be powered on when outside of the case, and case processor 210 can instruct the earbuds to turn the wireless radios off to save power when earbuds 115a and 115b are put in case 100 and lid 120 is closed. According to some embodiments, however, when case is coupled to an output device 285, case processor 210 can keep one or both of the wireless radios powered on, even if lid 120 is closed. Thus, the wireless radios of earbuds 115a, 115b may be able to continue to receive media from the media device and transmit the media to be played by the output device as will be described below.

Once it is determined that earbuds 115a, 115b are in case 100 (at step 410), that output device is attached to case and/or powered on (at step 430), and one or more of the wireless radios of earbuds 115a, 115b are accordingly powered on or maintained on (at step 450), earbuds 115a, 115b may be free to receive media data from a media player paired to earbuds 115a, 115b as described above. For example, if earbuds 115a, 115b are paired to a smart phone playing music, one or more of earbuds 115a, 115b can receive an audio signal with the music from the smart phone via wireless radios of the earbuds 115a, 115b. As a further example, if earbuds 115a, 115b are paired to a tablet device outputting video, one or more of earbuds 115a, 115b can receive video data from the tablet device via wireless radios of the earbuds 115a, 115b. However, as described above, rather than outputting the received data via speakers of earbuds 115a, 115b, when earbuds 115a, 115b are within receptacles 110a, 110b of case 100, earbuds 115a, 115b can be configured to send media data to case processor 210.

At step 460, case processor 210 can receive media data received by earbuds 115a, 115b from wireless radios via earbud interface 245. For example, if earbuds 115a, 115b are paired to a smart phone currently playing or otherwise outputting music, case processor 210 can receive audio data associated with the music from earbuds 115a, 115b via earbud interface 245. As a further example, if earbuds 115a, 115b are paired to a tablet device outputting video, case processor 210 can receive video data associated with the video from earbuds 115a, 115b via earbud interface 245.

At step 470, case processor 210 can transmit the media data received from the wireless radio of earbuds 115a, 115b to output device 285. As described above, step 470 can include case processor 210 causing the media data received to be processed by output circuitry as necessary to be transmitted and/or output by output device 285. In some embodiments, case processor 210 can transmit media data to output device 285 via output device interface 135.

At step 480, output device 285 can output the media data received from case processor 210 to be consumed by the user. For example, if output device 285 is an audio speaker, output device 285 can play audio for the user. As another example, if output device 285 is a display screen, output device 285 can play video for the user. As described above, output device 285 can be any suitable media output device for outputting audio, video, or other media data. In some embodiments, output device 285 may not include a wireless radio. Thus, it can be seen that the use of the wireless radios of earbuds 115a, 115b in conjunction with case 100 and an output device 285 without its own wireless radio can increase usage of output device 285 to effectively receive and output media from a media device not physically connected to output device 285 thereby increasing the flexibility of output device 285.

While a variety of devices that can wirelessly transmit audio to wireless listening devices such as wireless earbuds 115a, 115b exist, in some instances, users may want to limit the size and quantity of components needed to use wireless listening devices. For example, when a user is exercising, the user might not want to bring a large smart phone or personal music device to transmit music to their wireless earbuds. Furthermore, in some instances, users may encounter source devices that are not compatible with their wireless listening devices and may have to replace the wireless listening devices with wired listening devices or bring along wired adapters that may be cumbersome and/or easy to lose. A case that can both house the wireless earbuds for transport and wirelessly transmit audio data to the wireless earbuds is discussed with reference to FIGS. 5-8 according to embodiments of the disclosure.

Figure 5A:
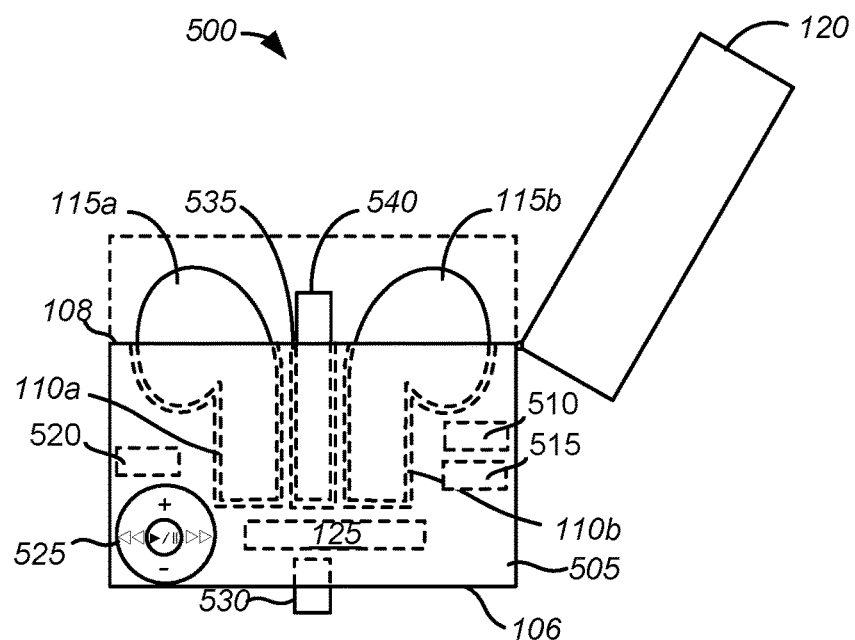
FIG. 5A is a side view of a case configured to hold a pair of wireless earbuds and transmit audio data to the wireless earbuds according to embodiments of the disclosure.

FIG. 5A is a side view of a case configured to hold a pair of wireless earbuds and transmit audio data to the wireless earbuds according to embodiments of the disclosure. As can be seen in FIG. 5A, case 500 can be similar to case 100 in a number of respects. For ease of reference, it will be understood that like numbered components can be substantially similar to previously referenced components except as otherwise stated. To avoid redundancy, such previously referenced components will not be discussed in detail. It can be seen with reference to FIG. 5A that in addition to components already discussed with respect to case 100, case 500 can include wireless radio 510 (including an antenna), memory 515, and radio battery 520 disposed within housing 505, and audio controls 525 and source device interface 530 disposed or integrated with housing 505. Additionally, case 500 can also have an additional receptacle 535 in which a controller 540 can be received as will be discussed in further detail below.

Figure 5B:
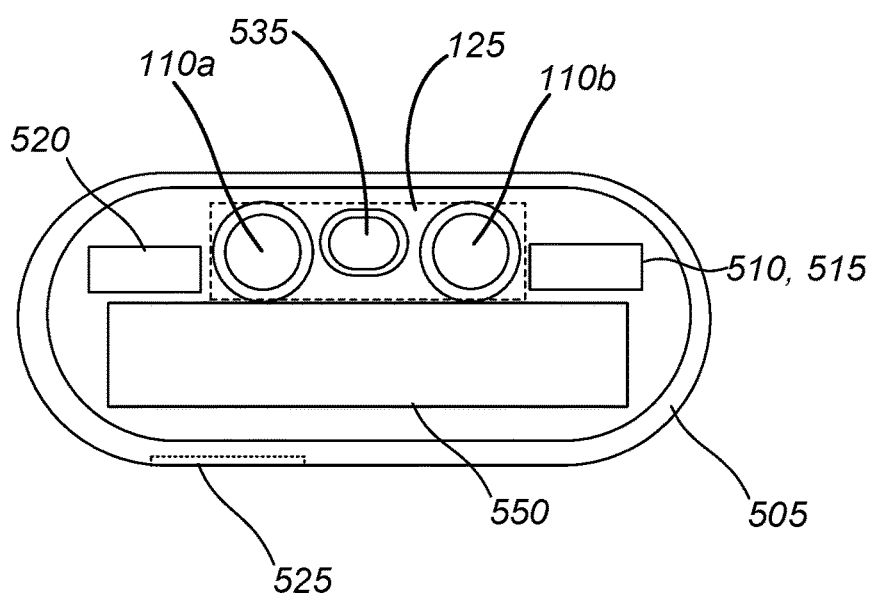
FIG. 5B is a top view of the case shown in FIG. 5A.

FIG. 5B is a simplified top view of case 500 with lid 120, earbuds 115a, 115b, and controller 540 removed for ease of reference. As can be seen in FIG. 5B, receptacles 110a and 110b can have a circular cross section for receiving cylindrical portions of earbuds 115a, 115b. As can also be seen in FIG. 5B, charging system 125 can be disposed directly below receptacles 110a, 110b, and 535 to facilitate charging of earbuds 115a, 115b, and controller 540. Given the geometry of the bud portions of earbuds 115a, 115b (i.e. the non-cylindrical portions of earbuds 115a, 115b), it can be seen that the spaces adjacent to receptacles 110a, 110b can be used to place additional battery 520, wireless radio 510, and memory 515. As depicted in FIG. 5B, area 550 located centrally within housing can include additional components and circuitry of case 500 (for example, components to be described below with reference to FIG. 6). It will be understood that while the aforementioned components are depicted in particular areas of case 500 in FIGS. 5A and 5B, such locations may simply be illustrative and components can be arranged in any suitable manner in accordance with embodiments with the disclosure.

Figure 6:
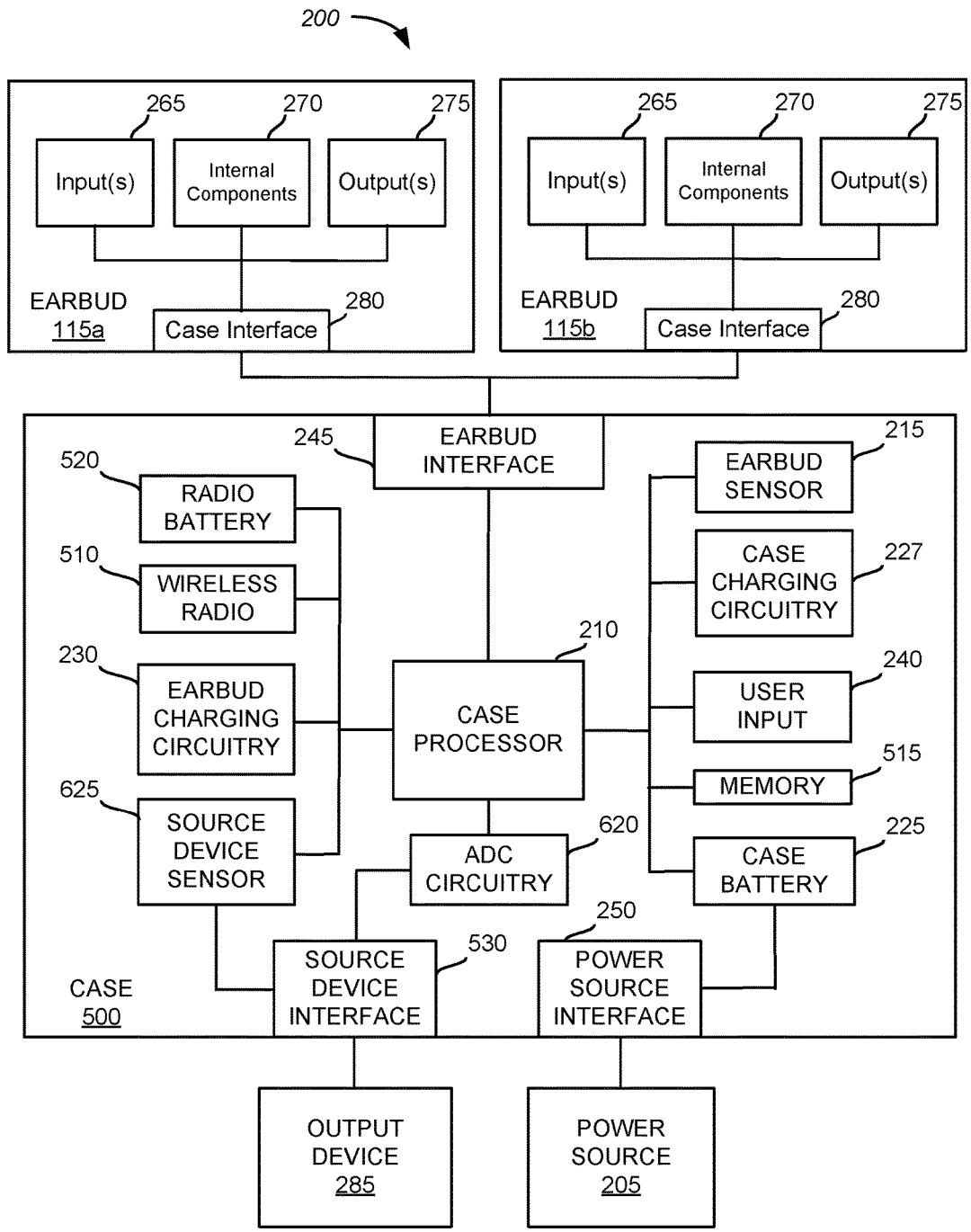
FIG. 6 is a system level diagram of a case coupled to a pair of earbuds and a source device as shown in FIGS. 5A and 5B.

FIG. 6 is a simplified illustration of a system 600 according to embodiments of the disclosure that includes case 500, pair of earbuds 115a, 115b, a power source 205, and a source device 615. Although not shown in FIG. 6, it will be understood that system 600 can also include controller 540 and associated charging circuitry and interfaces in case 500. As with FIGS. 5A-5B, like numbered components can be substantially similar to previously referenced components except as otherwise stated. To avoid redundancy, such previously referenced components will not be discussed in detail.

In some embodiments, case 500 can include its own wireless radio 510 and memory 515 which may allow case 500 to act as a standalone media player that wirelessly transmits audio to earbuds 115a, 115b when earbuds 115a, 115b are removed from case 500. Wireless radio 510 can be coupled to case processor 210, and as with wireless radios previously described with respect to earbuds 115a, 115b, wireless radio 510 can employ any short range, low power communication protocol such as Bluetooth, low power Bluetooth or other protocols. In some embodiments, wireless radio 510 may enable case 500 to both receive and transmit audio signals. In some embodiments, case 500 can include radio battery 520 dedicated to power wireless radio 510 to avoid depleting case battery 225 when no power source 205 is coupled to case 500. In other embodiments no additional radio battery 520 is included within the case and case battery 225 can power the wireless radio. For example, case battery 225 can have an increased capacity (relative to that of case 100, e.g.) to account for power demands of wireless transmission of audio to earbuds 115a, 115b. Wireless radio 510 can be configured to pair with earbuds 115a, 115b. In some embodiments, wireless radio 510 can pair with wireless radios of earbuds 115a, 115b when earbuds 115a, 115b are received in receptacles 110a, 110b of case 500. In some embodiments, wireless radio 510 can automatically pair with wireless radios of earbuds 115a, 115b when earbuds 115a, 115b are received in receptacles 110a, 110b of case 500. For example, when earbuds 115a, 115b are received in receptacles 110a, 110b of case 500 (for example when earbud sensors 215 detect earbuds 115a, 115b), case processor 210 can send a signal via wireless radio 510 or earbud interface 245 to initiate pairing between wireless radio 510 of case 500 and the wireless radios of earbuds 115a, 115b. In other embodiments, wireless radio 510 can pair with wireless radios of earbuds 115a, 115b in response to a user input such as a pairing button that causes case processor 210 to send a signal via wireless radio 510 or earbud interface 245 to initiate pairing between wireless radio 510 of case 500 and the wireless radios of earbuds 115a, 115b. In some embodiments, wireless radio 510 can be configured to simultaneously pair with multiple sets of earbuds 115a, 115b, other wireless listening devices, and/or a combination thereof. For example, wireless radio 510 can be configured to transmit the same audio to two or more sets of wireless earbuds 115a, 115b simultaneously.

Case processor 210 of case 500 can also be coupled to memory 515, which can comprise any suitable type of memory for storing data including audio data downloaded or otherwise received from a source device, such as a smart phone, a computer or the like. Thus, case processor 210 can be able to access audio data stored within memory 515 and transmit associated audio data via wireless radio 510 to be output by earbuds 115*a*, 115*b*. In some embodiments, audio data to be stored in memory 515 can be received by case processor 210 via wireless radio 510. In other embodiments, audio data to be stored in memory 515 can be received by case processor 210 via a wired connection through power source interface 250, as described above with respect to firmware updates of case 100. As described above, case 500 can also have user inputs 525 coupled to case processor 210, including controls that can pause or play audio playback, fast forward or rewind audio playback, and adjust the volume of playback by earbuds 115*a*, 115*b*.

FIGS. 7A and 7B are simplified illustrations of a case as shown in FIGS. 5 and 6 transporting wireless earbuds and wirelessly transmitting audio to the earbuds. As can be seen in FIGS. 7A and 7B, case 500 along with wireless earbuds 115*a*, 115*b* may allow a user to have a compact and low cost alternative for media playback in a single package. As shown in FIG. 7A, case 500 may allow the user to transport earbuds 115*a*, 115*b* in a convenient manner, and as shown in FIG. 7B, when desired, earbuds 115*a*, 115*b* can be removed from case 500 and play audio stored in case 500 while being controlled using controls 525. Thus, a user may not need to carry a smart phone or other bulky media device in order to use wireless earbuds 115*a*, 115*b* for media playback. This may be particularly desirable during exercise outside or at a gym, for example, when a user only needs a limited amount of media for playback.

In addition to acting as a standalone media player as described above, case 500 can also act to transmit audio to earbuds 115*a*, 115*b* from non-wireless devices, as will be further discussed with reference to FIGS. 5A, 6, and 8. As noted above and depicted in FIGS. 5A and 6, case 500 can include a source device interface 530. Source device interface 530 can be configured to couple case 500 to a source device 615 so as to receive an audio signal from the source device 615. In some embodiments, source device interface 530 can be any suitable audio interface, such as a standard male audio jack (i.e., a TRS connector with two, three, four or five ring contacts) that can be received in a female audio port of a source device, a standard female audio jack that can receive a standard auxiliary cable coupled to an audio port of a source device, or any other standard audio interface. Source device 615 can include any device that outputs audio, and in many cases, can be a device without wireless transmission capabilities. For example, source device 615 can include traditional in-flight entertainment audio systems, audio systems incorporated into exercise equipment such as treadmills, and/or portable audio devices without wireless transmission capabilities. Since, in some cases, source device 615 can output analog audio signals, case 500 can include an analog-to-digital-converter (ADC) and associated circuitry 620 coupled to source device interface and/or case processor. ADC 620 can be configured to receive analog audio from source 615 and convert it into digital audio. Once converted, the digital audio can then be transmitted by case processor 210 to wireless earbuds 115*a*, 115*b* via wireless radio 510. Thus, it can be seen that case 500 may allow an analog device without wireless transmission capabilities to be used with wireless earbuds 115*a*, 115*b* without the need for any wires.

It may be desirable to wirelessly transmit audio from a source device 615 simultaneously to two or more wireless listening devices. For example, two or more users may each want to personally listen to audio from a source device 615 to keep the audio private and/or allow each of the users flexibility to move to separate areas remote from the source device 615. In some embodiments, when case 500 is coupled to a source device 615, it can pair to multiple sets of wireless listening devices (e.g., two sets of wireless earbuds 115*a*, 115*b*), and case processor 210 can transmit the audio received from source device 615 to the multiple sets of paired wireless listening devices. For example, if multiple users are viewing video output from a source device that has an audio output port, but they would each like to listen to the corresponding audio using personal listening devices (such as wireless earbuds 115*a*, 115*b* or other wireless listening devices) the users can couple case 500 to the audio port of source device 615 via source device interface 530. Case processor 210 can receive audio from source device 615, process the audio if necessary as described above, and transmit the audio wirelessly to each set of wireless earbuds 115*a*, 115*b* (or other wireless listening devices paired to case 500). Thus, case processor 210 can act as a virtual splitter to send audio to multiple wireless listening devices.

Case processor 210 of case 500 can also be coupled to source device sensor 625. Source device sensor 625 can be similar to output device sensor 260 described above with respect to case 100, except it can detect a source device from which audio can be received rather than an output device to which media can be transmitted. Source device sensor 625 detects when a source device 615 is coupled to case 500 via source device interface 530. In some embodiments, source device sensor 625 can detect when a source device 615 is powered on and/or transmitting audio that can be transmitted to earbuds 115*a*, 115*b*. In some embodiments source device sensor 615 can detect the type of source device 615 coupled to case 500 and transmit information indicative of the type of source device 615 to case processor 210. In various embodiments case processor 210 or other circuitry can be configured to power on the wireless radio 510 and/or initiate transmission of audio from source device 615 to earbuds 115*a*, 115*b* when source device sensor 615 detects a source device 615 coupled to source device interface 530, and can be configured to power off the wireless radio 510 (and any other components used for transmission of audio from source device 615) and cease transmission of audio via ADC circuitry when source device sensor 625 does not detect a source device 615 coupled to source device interface 530. In some embodiments source device sensor 625 can be any type of mechanical or electrical switch, including but not limited to a momentary switch, a capacitive sensor, a magnetic sensor (e.g., hall effect) or an optical sensor.

FIG. 8 is a simplified illustration of the case of FIGS. 5A, 5B, and 6 wirelessly transmitting audio received from a non-wireless source device to a pair of wireless earbuds. Specifically, FIG. 8 shows a source device 615 coupled to case 500 via source device interface 530. Source device 615 shown in FIG. 8 is a traditional in-flight audio system that has a standard audio port 805 which can receive standard male audio jack 530 of case 500 so as to transmit audio being output by source device 615 to case 500. As can be seen, case 500 can process and transmit the audio received from source device 615 to be output by earbuds 115*a*, 115*b* using wireless radio 510 (not shown in FIG. 8). As such, wireless earbuds 115*a*, 115*b* can be used in a situation in which they may not otherwise have been used without a wired connection. Although a traditional in-flight audio system is depicted in FIG. 8, it will be understood that any suitable source device 615 can be used in substantially the same way in accordance with embodiments of the disclosure.

Figure 9:
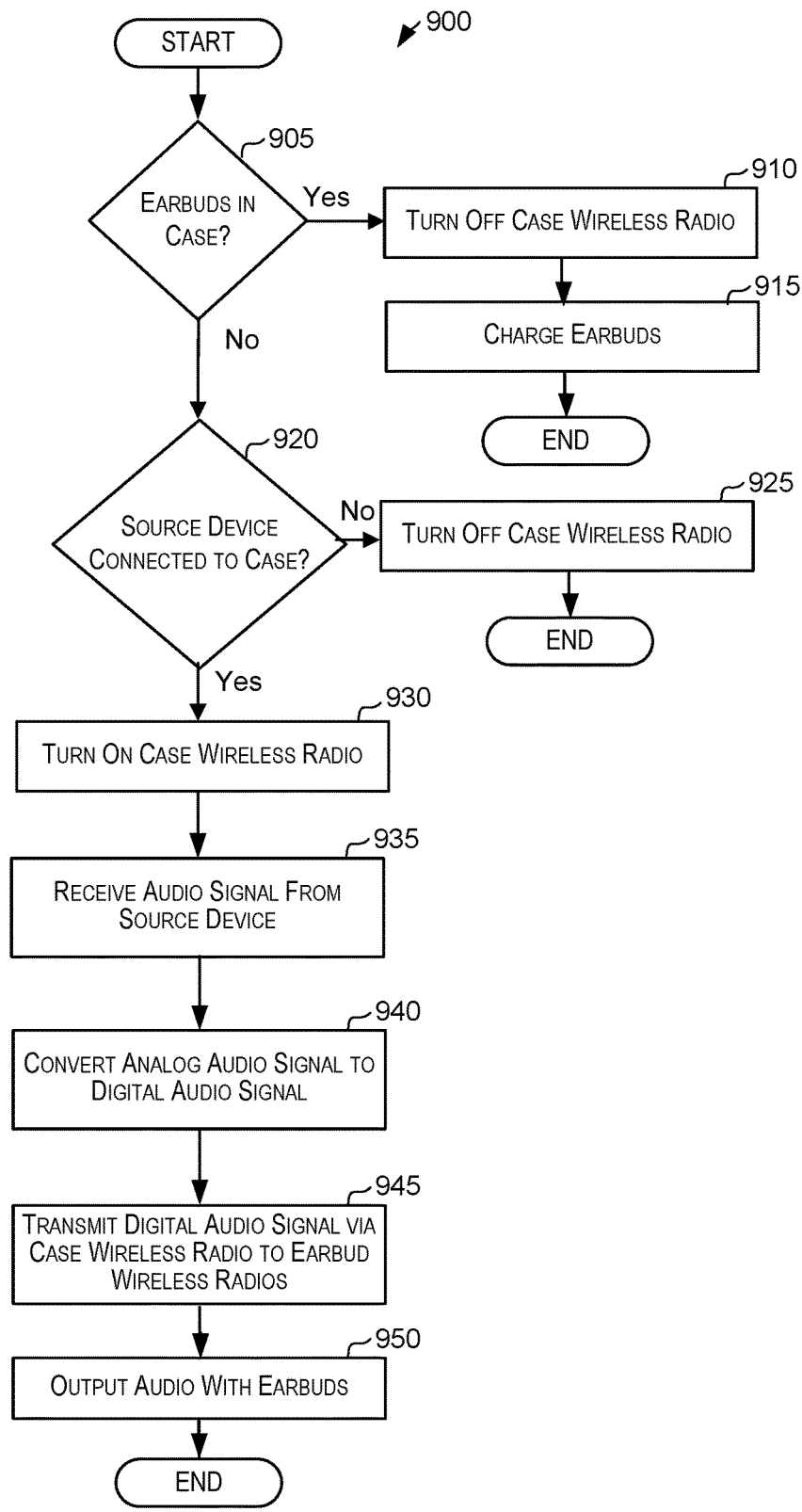
FIG. 9 is a flow chart showing a method of managing charging and wireless transmission of audio from a case to a wireless listening device according to embodiments of the disclosure.

As described above, case 500 can both charge earbuds 115a, 115b when earbuds 115a, 115b are received in receptacles and transmit audio to the earbuds 115a, 115b when earbuds 115a, 115b are removed from receptacles 110a, 110b. Since case 500 and earbuds 115a, 115b can have rechargeable batteries with limited life, and since it may be desirable to use case 500 to transport earbuds 115a, 115b without power source 205 connected thereto, it may be desirable to efficiently control both charging and powering of components. FIG. 9 is a flow chart showing a method 900 of managing charging and wireless transmission of audio from a case to a wireless listening device according to embodiments of the disclosure. It will be understood by those skilled in the art that the order of the steps can be switched, some of the steps can be combined, and/or some of the steps can be optional. The flowchart of FIG. 9 is one example of the method and is not intended to be limiting. Thus, it will be understood by those skilled in the art that various other operation(s) disclosed in this application can be used instead of those shown in FIG. 9. The steps will now be described with reference to FIG. 9.

At step 905, case processor 210 can determine whether earbuds 115a, 115b are received in case 500. In some embodiments, earbud sensor 215 can detect whether one or both of earbuds 115a, 115b are received in receptacles 110a, 110b of case 500 as described above and relay this information to case processor 210. If it is determined at step 905 that one or both of earbuds 115a, 115b are received in case 500, case processor 210 can proceed to step 910. At step 910, case processor 210 can turn off wireless radio 510 of case 500. It will be understood that wireless radio 510 may not be needed if earbuds 115a, 115b are in case 500. Thus, turning off wireless radio 510 in this situation can preserve batteries 520, and/or 225. After turning off wireless radio 510, case processor can proceed to initiate charging of earbuds 115a, 115b at step 915. This may continue until earbuds 115a, 115b are fully charged or until they are otherwise taken out of the case. If it is determined at step 905 that earbuds 115a, 115b are not in case 500, case processor can proceed to step 920.

At step 920, case processor 210 can determine whether a source device is connected to case 500. For example, as described above, source device sensor 625 can detect whether a source device 615 is coupled to case 500 via source device interface 530. In some embodiments, source device sensor 625 can detect when a source device 615 is powered on and/or transmitting audio that can be transmitted to earbuds 115a, 115b. If source device sensor 625 does not detect a source device 615 coupled to case 500, or if source device detects that a source device 615 coupled to case 500 is not powered on or is not transmitting audio, case processor 210 can proceed to step 925 and turn of wireless radio 510 of case 500 to preserve the batteries 520 and/or 225 of case 500. Since case 500 may not need to perform any electrical operations, case processor 210 can also turn off any other additional components unnecessarily drawing power and the process may "end" until a source device 615 and transmission of audio thereby is detected. If it is determined at step 920 that source device 615 is connected, powered on, and transmitting audio, case processor 210 can proceed to step 930.

At step 930, if wireless radio 510 of case 500 is not already on, case processor 210 can turn wireless radio 510 on to facilitate transmission of audio received from source device 615 to earbuds 115a, 115b. As described above, once wireless radio 510 is on, it can pair with earbuds 115a, 115b automatically or upon user input.

At step 935, which in some embodiments can happen concurrently with step 930, case processor 210 can receive an audio signal from source device 615 via source device interface 530. Once wireless radio 510 is paired with wireless radios of earbuds 115a, 115b and an audio signal is received via source device interface, case processor 210 can proceed to step 940 and/or 945. As described above, the audio signal received from source device 615 can be analog in some embodiments. In such case, the analog audio signal is first converted into a digital signal by ADC circuitry 620 at step 940 before case 500 can wirelessly transmit the audio signal to the earbuds. Once the digital signal is obtained (either received directly in step 935 or via a converted analog signal in step 940), case processor can proceed to step 945. At step 945, case processor 210 can transmit the converted digital signal via wireless radio 510 to the wireless radios of earbuds 115a, 115b, which can then output the audio via speakers of the earbuds to the user at step 950.

Figure 10B:
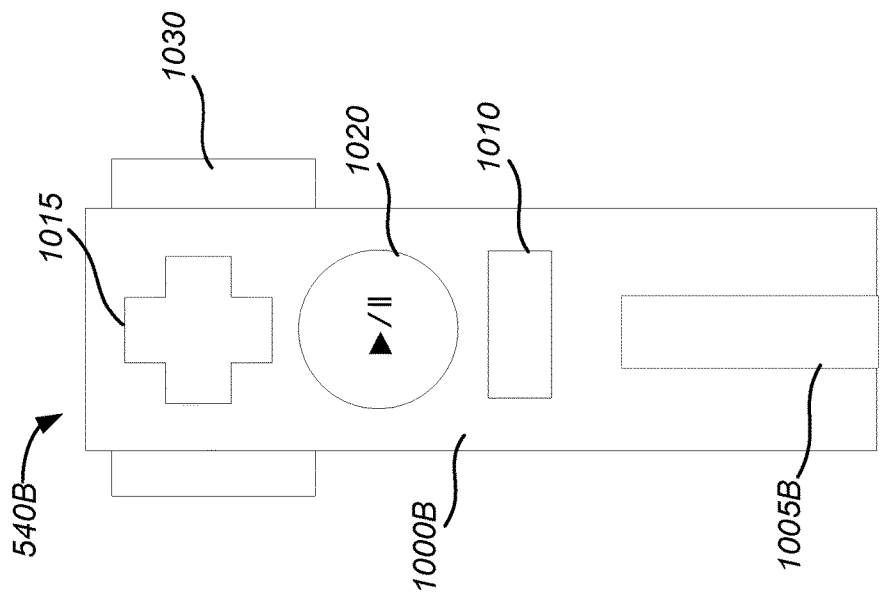
FIGS. 10A and 10B are front views of wireless controllers of a wireless listening device according to embodiments of the disclosure.
Figure 10A:
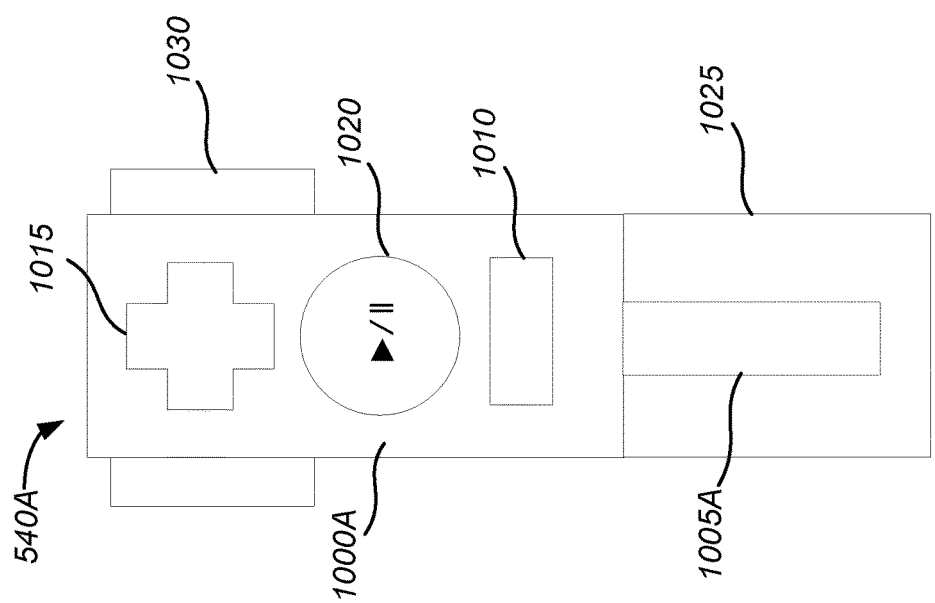
Figure 11:
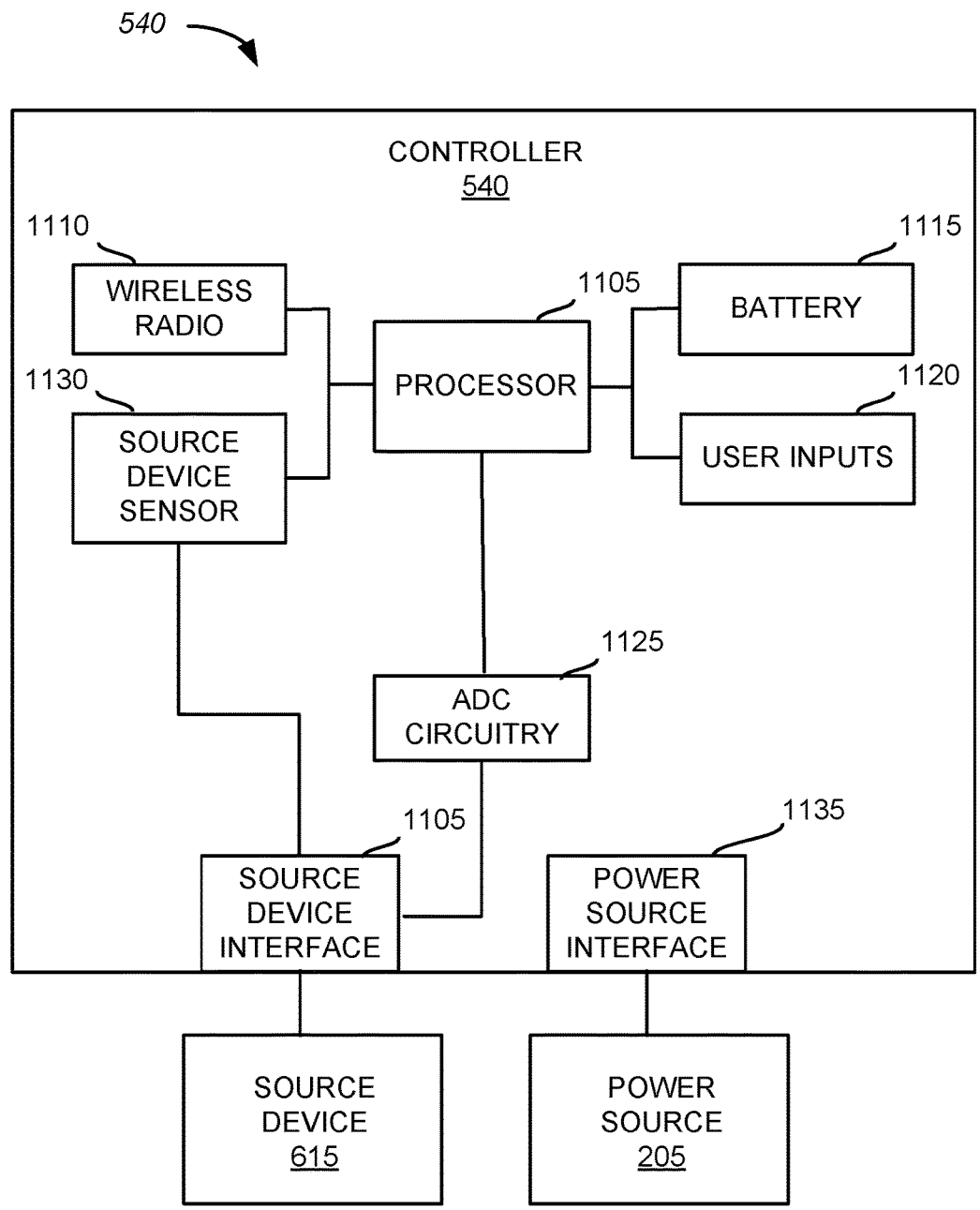
FIG. 11 is a system level diagram of a wireless controller of a wireless listening device as shown in FIGS. 10A and 10B.

In addition to cases as described herein, it can be desirable to have increased control of audio playback when using wireless listening devices such as earbuds 115a, 115b. In some embodiments, a controller that can wirelessly control playback during use of earbuds 115a, 115b is provided. As previously described with reference to FIGS. 5A-5B, controller 540 can also be receivable in cases described herein, for example, within receptacle 535. FIGS. 10A and 10B are front views of alternate embodiments of wireless controllers of a wireless listening device according to embodiments of the disclosure, and FIG. 11 is a system level diagram of the wireless controller shown in FIGS. 10A and 10B. As can be seen in FIGS. 10A-10B and FIG. 11, wireless controller 540 can include a housing 1000A or 1000B with volume controls 1010 and 1015 and playback controls 1020 disposed thereon. Additionally, wireless controller 540 can include a clip mechanism 1030 that can be used to releasably attach controller 540 to an article associated with a user. For example, clip mechanism 1030 can clip controller 540 to a shirt of the user to provide easy access to controller 540 during use of wireless earbuds 115a, 115b. With reference to FIG. 11, it can be seen that controller 540 can include a processor 1105 which can be coupled to a wireless radio 1110, battery 1115, user inputs 1120 (which can include volume controls 1010, 1015 and playback controls 1020), and a power source interface 1135 which may allow controller to be coupled to a power source 205 in order to charge battery 1115, for example. As described above with respect to FIGS. 5A-5B, controller 540 can be configured to be charged by charging system 125 of case 500 when controller 540 is received in receptacle 535 of case 500. Wireless radio 1110 of controller 540 can be configured to communicate with wireless radios described herein, including those of cases 100 and 500, earbuds 115a, 115b, and/or any of the media players described herein. For example, wireless radio 1110 can be configured to send commands to control playback and/or volume of media being played on earbuds 115a, 115b based on input received via user inputs 1120.

In addition to control of playback of media on earbuds 115a, 115b, in some embodiments, controller 540 can also include a source device interface similar to that of case 500 described above, which allows controller 540 to couple to a source device 615 to receive audio therefrom. As with source device interface 530 of case 500, the source device interface can be coupled to ADC circuitry 1125 and source device sensor 1130 which are in turn coupled to processor 1105. As with source device interface 530 of case 500, the source device interface can be any suitable audio interface, such as a standard male audio jack that can be received in a female audio port of a source device, a standard female audio jack that can receive a standard auxiliary cable coupled to an audio port of a source device, or any other standard audio interface. For example, in one embodiment shown in FIG. 10A, a source device interface 1005A can be a standard male audio jack which has a detachable cap 1025 for protecting interface 1005A when not in use. In another embodiments shown in FIG. 10B, a source device interface 1005B can be a standard female audio jack that can receive a standard auxiliary cable coupled to an audio port of a source device. In still other embodiments, the source drive interface can include both male and female connectors. As with ADC Circuitry 620 of case 500, ADC Circuitry 1125 can be configured to receive analog audio from source 615 and convert it into digital audio. Once converted, the digital audio can then be transmitted by processor 1105 to wireless earbuds 115a, 115b via wireless radio 1110. Thus, it can be seen that as with case 500, controller 540 can allow an analog device without wireless transmission capabilities to be used with wireless earbuds 115a, 115b without the need for any wires. As can be understood, controller 540 may be particularly convenient in this respect since it may be less cumbersome to carry than even case 500.

FIG. 12 is a simplified illustration of a wireless controller wirelessly transmitting audio received from a non-wireless source device to a pair of wireless earbuds as shown in FIGS. 10A-10B and 11. Specifically, FIG. 12 is similar to FIG. 8, except that it shows a source device 615 coupled to controller 540A rather than case 500 via source device interface 1005A. As with FIG. 8, source device 615 shown in FIG. 12 is a traditional in-flight audio system that has a standard audio port 1205 which can receive standard male audio jack 1005A of controller 540A so as to transmit audio being output by source device 615 to controller 540A. As can be seen, controller 540A can process and transmit the audio received from source device 615 to be output by earbuds 115a, 115b using wireless radio 1110 (not shown in FIG. 12). As such, wireless earbuds 115a, 115b can be used in a situation in which they may not otherwise have been used without a wired connection. Although a traditional in-flight audio system is depicted in FIG. 12, it will be understood that any suitable source device 615 can be used with controller 540A in substantially the same way in accordance with embodiments of the disclosure.

FIG. 13 is a simplified illustration of a wireless controller wirelessly controlling audio transmission to a pair of wireless earbuds as shown in FIGS. 10A-10B and 11. As described above, controller 540 can be releasably attached to a shirt pocket 1310 or other article of clothing of a user 1305 via clip 1030 for easy access to control audio being played on earbuds 115a, 115b. It can be seen that controller 540 can provide the advantage of avoiding cumbersome wires typically required for inline controllers of wired earbuds, but still be attached to the user to maintain easy access and avoid losing controller 540.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure. Additionally, spatially relative terms, such as "bottom or "top" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface may then be oriented "above" other elements or features. The device can be otherwise oriented (e.g., rotated 90 degrees or at other orientations) and the spatially relative descriptors used herein interpreted accordingly.

What is claimed is:

1. A case for an earbud having a first wireless radio, the case comprising:
   a housing having a receptacle configured to receive the earbud;
   a connector coupled to the housing and configured to electrically couple the case to a source device so as to receive an audio signal from the source device;
   a second wireless radio configured to transmit audio data to the first wireless radio;
   a power source disposed in the housing and operatively coupled to power the second wireless radio;
   circuitry disposed within the housing, the circuitry configured to: establish a connection between the first wireless radio and the second wireless radio, receive the audio signal from the source device via the connector, and convert the audio signal into the audio data to be transmitted by the second wireless radio to the first wireless radio for output by the earbud.

2. The case of claim 1 wherein the connector comprises a plug connector configured to be received by an audio output port coupled to the source device.

3. The case of claim 2 wherein the plug connector comprises a TRS connector having a plurality of ring contacts.

4. The case of claim 1 wherein the power source comprises a rechargeable battery and the case includes a second connector configured to electrically couple the case to an external power source to charge the rechargeable battery and/or provide power to the earbud when the earbud is received in the receptacle.

5. The case of claim 1 wherein the circuitry is configured to establish a first wireless connection between a first pair of earbuds and the second wireless radio and a second wireless connection concurrent with the first wireless connection between a second pair of earbuds and the second wireless radio, and to simultaneously transmit the audio data to both the first pair of earbuds and the second pair of earbuds.

6. The case of claim 1 wherein the connector comprises an audio input port configured to receive an audio plug connector associated with the source device.

7. The case of claim 1 wherein the housing of the case includes a first receptacle sized and shaped to receive a first earbud in a pair of earbuds and a second receptacle sized and shaped to receive a second earbud in the pair of earbuds.

8. An audio system comprising:
   an earbud having a first wireless radio; and
   a case for storing and charging the earbud, the case comprising:
   a housing having a receptacle configured to receive the earbud;

a connector coupled to the housing and configured to electrically couple the case to a source device so as to receive an audio signal from the source device;

a second wireless radio configured to transmit audio data to the first wireless radio;

a power source disposed in the housing and operatively coupled to power the second wireless radio;

circuitry disposed within the housing, the circuitry configured to: establish a connection between the first wireless radio and the second wireless radio, receive the audio signal from the source device via the connector, and convert the audio signal into the audio data to be transmitted by the second wireless radio to the first wireless radio for output by the earbud.

9. The audio system of claim 8 wherein the earbud is a first earbud in a pair of earbuds, the audio system further comprises a second earbud in the pair of earbuds, and the housing of the case includes a first receptacle sized and shaped to receive the first earbud and a second receptacle sized and shaped to receive the second earbud.

10. The audio system of claim 9 further comprising a controller, separate from the case and the earbud, and operable to stop and start transmission of the audio data from the second wireless radio to the pair of earbuds.

11. The audio system of claim 10 wherein the controller further comprises volume control inputs that control the volume of sound on the first and second earbuds.

12. The audio system of claim 11 wherein the controller further comprises a clip configured to attach the control to clothing worn by a user.

13. The audio system of claim 10 wherein the case further includes a third receptacle sized and shaped to receive the controller.

14. The audio system of claim 13 wherein the third receptacle is disposed between the first and second receptacles and wherein the case further includes a lid coupled to the housing by a hinge, the lid being moveable between a closed position in which the lid covers encases the first and second earbuds and the controller within the case and an open position in which a user can remove one or more of the first and second earbuds or the controller from the case.

15. The audio system of claim 9 wherein the power source comprises a rechargeable battery and the case includes a second connector configured to electrically couple the case to an external power source to charge the rechargeable battery and/or provide power to the first and second earbuds when the earbuds are received in the first and second receptacles, respectively.

16. The audio system of claim 8 wherein the circuitry that converts the audio signal into the audio data to be transmitted by the second wireless radio converts an analog audio signal received over the connector to digital audio data.

17. A case for a portable listening device having a first wireless radio, the case comprising:

a housing having a receptacle configured to receive the portable listening device;

a rechargeable case battery disposed in the housing;

charging circuitry coupled to the rechargeable battery and the receptacle and configured to charge the portable listening device when the portable listening device is received in the receptacle;

a memory disposed in the housing and configured to store audio data;

a processor disposed in the housing and operably coupled to access audio data stored in the memory;

a second wireless radio operatively coupled to receive audio data from the processor and transmit the audio data to the first wireless radio to be output by the portable listening device; and a user interface disposed at an exterior surface of the housing, the user interface including one or more controls that enable a user to stop and start the transmission of audio data from case to the portable listening device.

18. The case set forth in claim 17 wherein the portable listening device is a pair of earbuds that includes a first earbud and a second earbud, and wherein the housing includes a first receptacle sized and shaped to receive the first earbud and a second receptacle sized and shaped to receive the second earbud.

19. The case of claim 18 further comprising a lid coupled to the housing by a hinge, the lid being moveable between a closed position in which the lid covers encases the first and second earbuds and an open position in which a user can remove one or more of the first and second earbuds from the case.

20. The case of claim 17 wherein the user interface comprises volume control inputs.

* * * * *